FILE SEARCH DATA SELECTOR

Original Filed May 5, 1958

FILE SEARCH FOR A,B,C,D IN COLUMNS 5,6,7,8 (FIXED FIELD OPERATION)

INVENTORS
EDWARD J. RABENDA
WAYNE D. BRODD
EUGENE E. MARQUARDT

BY Wesley De Bruin
ATTORNEY

FILE SEARCH DATA SELECTOR

March 29, 1966 E. J. RABENDA ETAL 3,243,783

FILE SEARCH DATA SELECTOR

Original Filed May 5, 1958 13 Sheets-Sheet 3

March 29, 1966 E. J. RABENDA ETAL 3,243,783

FILE SEARCH DATA SELECTOR

Original Filed May 5, 1958 13 Sheets-Sheet 4

March 29, 1966 E. J. RABENDA ETAL 3,243,783

FILE SEARCH DATA SELECTOR

Original Filed May 5, 1958 13 Sheets-Sheet 12

March 29, 1966 E. J. RABENDA ET AL 3,243,783

FILE SEARCH DATA SELECTOR

Original Filed May 5, 1958 13 Sheets-Sheet 13

United States Patent Office 3,243,783
Patented Mar. 29, 1966

3,243,783
FILE SEARCH DATA SELECTOR

Edward J. Rabenda, Poughkeepsie, Wayne D. Brodd, Wappingers Falls, and Eugene E. Marquardt, Poughkeepsie, N.Y., assignors to International Business Machines Corporation, New York, N.Y., a corporation of New York Original application May 5, 1958, Ser. No. 733,188, now Patent No. 3,126,523, dated Mar. 24, 1964. Divided and this application May 10, 1962, Ser. No. 196,545
14 Claims. (Cl. 340—172.5)

This application is a division of copending application Serial No. 733,188, filed May 5, 1958.

This invention relates to a File Search Tape Data Selector specifically adapted to perform a "Fixed Field File Search Operation" and, or a "Floating Word File Search Operation." The File Search circuitry of the File Search Tape Data Selector is disclosed herein, for rendering more clear its operation and extensive utility, as employed in a Tape Data Selector of the type disclosed and claimed in the Edward J. Rabenda, et al., U.S. patent application, Serial Number 648,371, filed March 25, 1957, and entitled Data Selector now Patent No. 3,040,300. The above identified E. J. Rabenda et al. U.S. patent application is of common assignee with this application and for convenience is hereinafter referred as application A.

Present day Data Processing Systems may store a large amount of information in record. Each record may be of variable length: the information within each record may be of great variation in word length: and no codes are employed between records. All the information stored in one or more records may, at some time, be required and used in the preparation of reports, in the performance of calculations prior to the preparation of a report, or in any other Data Processing operations. However, at other times, only certain portions of the data, or information, in one or more records may be required. It is to the Data Processing of only certain portions of the data, or information, in one or more records that the File Search Tape Data Selector of the present invention is particularly adapted and of great utility. However, from the detailed description of the File Search Tape Data Selector that follows herein it will be readily appreciated that the utility thereof is in no way limited to the above application.

For example, personnel records each may contain personal information such as date of birth, education, job experience, rate of pay, date of employment, various types of personal deductions, deductions such as taxes required by law, and the like.

For payroll preparation, such information as rate of pay, deductions and the like are required, while reports on employees with certain qualifications require information such as education, age, job experience etc. Corresponding for insurance purposes such as information as age, date of employment, and the like are required.

Due to the great amount of information required in each record, current Data Processing Systems utilize magnetic tape as a basic source of data. However, in prior systems, flexibility in operation and in the selection of data from the tapes has been limited.

It is an object of this invention to provide a File Search Data Selector capable of automatically performing a variety of different selections in a novel manner.

An object of this invention is to provide a File Search Data Selector for processing records of variable lengths.

An object of this invention is to provide a File Search Data Selector for processing records of variable length, wherein the data in each record is set forth in words of variable length.

An object of this invention is to provide a File Search Data Selector for processing records of variable lengths, with variable length words therein and where no address or identifying code for each record is necessary to subsequently select it.

An object of this invention is to provide a File Search Data Selector for selecting certain records from a group of records and reading the information stored in said certain records into storage and skipping the remaining records of said group of records.

An object of this invention is to provide a File Search Data Selector for selecting certain records each containing at least a predetermined group of characters therein in a prescribed order, from a group of records, and reading the entire information stored in said selected certain records into storage for data processing purposes.

An object of this invention is to provide a File Search Data Selector for selecting certain records, each containing at least a predetermined group of characters therein in a prescribed order, from a group of records, and rendering the entire information stored in said selected certain records available for data processing purposes.

An object of this invention is to provide a File Search Data Selector for selecting certain records, each containing at least a predetermined group of characters therein in a prescribed field, from a group of records, and reading the entire information stored in each of said selected certain records into storage for data processing purposes.

An object of this invention is to provide a File Search Data Selector for selecting certain records, each containing at least a predetermined group of characters therein in a prescribed field, from a group of records and rendering the entire information stored in said selected certain records available for data processing purposes.

An object of this invention is to provide a File Search Data Selector for selecting certain records, each containing at least a predetermined group of characters therein in a prescribed order, from a group of records, and rendering the entire, or any portion, of the information stored in said selected certain records available for data processing purposes.

An object of this invention is to provide a File Search Data Selector for selecting certain records, each containing at least a predetermined group of characters therein in a prescribed field, from a group of records, and rendering the entire, or any portion, of the information stored in said selected certain records available for data processing purposes.

An object of this invention is to provide a File Search Data Selector for selecting certain records, each containing at least a predetermined word anywhere therein, from a group of records, and rendering the entire, or any portion, of the information stored in said selected records available for data processing purposes.

An object of this invention is to provide a File Search Data Selector in accordance with the preceding object and characterized in that said word may consist of alphabetic characters, numeric characters, characters other than alphabetic or numeric, or any combination of the afore-recited characters.

An object of this invention is to provide a File Search Data Selector for reading records from a tape, a drum, or the like, and selectively skip certain records in a group of records.

An object of this invention is to provide a File Search Data Selector for reading records from a tape, a drum, or the like, and to selectively select certain records from a group of records.

An object of this invention is to provide a File Search Data Selector to select corresponding data, or different data, from each record of a group of records.

An object of this invention is to provide a File Search Data Selector for selecting data from a plurality of records and to store the selected data.

An object of this invention is to provide a File Search Data Selector with means for continually indicating which record and which character of said record is being read.

An object of this invention is to provide a File Search Data Selector for reading records and having counters to count the records and characters read.

An object of this invention is to provide a File Search Data Selector for reading records and including means responsive to certain characters contained in certain records to effect storage of at least a portion of the data stored in said certain records.

An object of this invention is to provide a File Search Data Selector for controllably, or automatically, reading a data tape forward a predetermined number of records, to backspace a second predetermined number of records and then to resume reading the data tape in a forward direction.

An object of this invention is to provide a File Search Data Selector for controllably, or automatically, reading and rereading a tape record and to select different portions of the data during each reading.

An object of this invention is to provide a File Search Data Selector for searching tape wherein information to be searched for, does not have an assigned address.

An object of this invention is to provide a File Seach Data Selector which permits indiscriminate preparation of records within which information may be recorded, in any manner, by each of many people recording this data, yet upon requirement any portion of this random recorded data and any record of the tape may be selected for processing.

An object of this invention is to provide a File Search Data Selector for searching for information in existing files which are not set up in a particular format.

An object of this invention is to provide a File Search Data Selector within which record identifying codes are completely eliminated and yet common information may be correlated.

An object of this invention is to provide a File Search Data Selector wherein a minimum tape record block may always be used yet provide a means for variable word length searching. For example, the magazine title LIFE requires only four characters whereas the magazine title COSMOPOLITAN requires twelve characters.

An object of this invention is to provide a File Search Data Selector for selecting records having words therein containing a similar letter sequence, such as transistor and transistorized.

An object of this invention is to provide a File Search Data Selector for file searching tape records, the information of which was obtained from punched cards punched at random by untrained operators.

An object of this invention is to provide a File Search Data Selector for, under control of a normal space between words, automatically controlling the sequence of checking each word passing the tape reading means.

An object of this invention is to provide a File Search Data Selector whereby a synonym of words may be correlated such as lever, arm, blank, bar, etc. as usually referred to by different individuals.

An object of this invention is to provide a File Search Data Selector whereby searching for a word, or words, may begin under control of one of the letters within the word. For example, the word transistor and the word semiconductor would be file searched and initiated under control of the letter T followed by O or R.

An object of this invention is to provide a File Search Data Selector whereby certain words having a common series of letters may be correlated. For example, the words, magnet, magnetic, demagnetized, demagnetize, etc.

An object of this invention is to provide a File Search Data Selector whereby part numbers representing bills of materials, or assemblies, calling for part numbers may be indiscriminately placed within a record yet later correlated.

An object of this invention is to provide a File Search Data Selector that has particular utility in patent searching, Chemical Industries, production control, investigative materials, Armed Forces, literature searching, word analysis, study of languages, etc.

An object of this invention is to provide a File Search Data Selector for performing a Fixed Field File Search Operation and, or a Floating Word File Search Operation.

An object of this invention is a File Search Data Selector that is particularly adapted for use with an "IBM 402," and an "IBM 403," an "IBM 407" or an "IBM 519."

Other objects of the invention will be pointed out in the following description and claims and illustrated in the accompanying drawings, which disclose, by way of example, the principle of the invention and the best mode which has been contemplated of applying that principle.

The apparatus of the novel File Search Data Selector, as described herein, employs magnetic tape as a data source, and magnetic cores as a storage unit, but it will be obvious to those skilled in the art that various types of data sources and storage devices could be employed.

The File Search Data Selector disclosed herein provides control circuits which cause the reading of a magnetic tape containing manifestations grouped to represent characters and blocks of information. Counters are provided to count blocks and characters as the tape is read. The counters in combination with the control circuits provide means whereby a selected number of blocks may be read and certain blocks may be reread or skipped as information is selected character by character from the blocks.

A brief description of Fixed Field Operation of the File Search Data Selector, described in detail hereinafter, will now be set forth. The Fixed Field Operation permits tape records to be searched for a certain combination of characters located in fixed columns in the record. For example, each record can be examined to see if the characters A, B, C and D occur in columns 5, 6, 7 and 8, respectively. In addition records can be searched for the presence of two or more groups of characters. Also, the record can be searched for the presence of one, or the other, of different classes of data. As the tape read feeds in a forward direction pulses derived from the tape for each column are translated into the Hollerith code and go directly to plug hubs called Tape Emitter Hubs. A counter counts columns on the tape and plug hubs are provided so that as each column is sensed a pulse or pulses will be emitted which are indicative of the column being sensed. For example, plug hub number 1 in the units column will emit a pulse when the first column is sensed. A plug hub number 2 in the units column will emit a pulse when the second column is sensed, etc. Column 10 will be indicated by a pulse from plug hub number 1 in the tens column and a pulse from plug number 0 in the units column. An Electronic Selector is plugged so that it picks on the first column of the field to be searched and drops out after the last column thereof. Pluggable AND circuits are employed so that a pulse from a particular column counter can be ANDed with the proper pulse or pulses from the Tape Emitter. If, for example, it is desired to search for an A in column 5, the number 5 plug hub in the units column of the column counter will be plugged to one input of the AND circuit plug hubs 12 and 1 of the tape emitter which represent an "A" in Hollerith code, will be plugged to the other inputs of the same AND circuit. If pulses are present from both the column counter and from the tape emitter, the AND circuit have an output and the machine will proceed to examine characters from succeeding columns of the tape. If all columns agree tape feed will stop. The tape will back up to the start of the record, then resume forward travel and render available for storage, or processing, the data, or any selected portion thereof, contained in this record, a Selected Record.

A brief description of Floating Word Operation of the File Search Data Selector, described in detail hereinafter, will now be set forth . The Floating Word operation permits a record on a tape to be selected by recognizing a word, a combination of words, one or the other of two words, or a particular sequence of letters, numbers, etc., regardless of their position on the record. An example would be titles of magazine articles where the word of interest might be located anywhere within the title. Furthermore, the word of interest might be, for example, either "motor" or "engine" as either word might be used in a magazine article. As in the Fixed Field Operation a column counter and pluggable AND circuits are employed. In a Floating Word Operation, however, the Tape Block column is reset to zero when the first character of the word searched for is recognized. The Tape Block Column Counter will then control comparison of succeeding characters of the word. In the case of searching for either of two (or more) words, the Tape Block Column Counter is reset when the first character of either word is recognized. Electronic Selectors are employed to establish the character of sequence to be examined as distated by the first character sensed. When a searched for word is located tape feed stops. The tape is backspaced to the start of the record containing the searched for word. Thereafter the tape resumes forward travel and renders available for storage, or processing, the data, or any selected portion thereof, contained in this record, a Selected Record.

DEFINITIONS

Definitions of terms used subsequently herein will now be set forth.

*Tape emitter hubs.*—Exit hubs from which the tape characters are available in card code as they are internally processed in a serial fashion. The output pulses are in synchronism with the Tape Block Column Counter, thereby providing for recognition of a specific character in any tape column by control panel wiring. All characters are present at the emitter hubs although they are not all selected for buffer entry. The NO ZONE HUB (N.Z.) provides the necessary exclusiveness for recognition of a numeric character.

*File search ON (F.S. ON).*—A "bottle plug" switch which provides the necessary interlocking for a File Search type of Operation. The more important interlocking features are: the automatic backspace after finding a Selected Record; the gating of storage entry control so that it is effective only after a Selected Record has been found and backspacing has occurred; and preventing the advance of the Forward Block Counter for all but Selected Records. Removal of the F.S. ON plug restores machine operation to normal as determined by control panel wiring for tape motion and buffer entry.

*Field definition (F.D.).*—An entry hub that requires an input to define the field or fields to be interrogated for file search control. The timing required is basically that provided by the Tape Block Column Counter. For this reason the F.D. hub is normally wired to the Tape Block Column Counter directly (through necessary incidence and coincidence units) if single or few consecutive columns are involved in each field or to an Electronic Selector if numerous consecutive columns are involved. In this case the selector is picked on the first and dropped on the last column of each field with common wire to a plug hub C.

*File search (F.S.).*—An entry hub used in conjunction with the Tape Emitter Hubs to determine if a given record is to be selected or passed. Basically the desired characters are wired for coincidence with the proper columns to provide this input. If coincidence occurs for all inputs within the Search Field the record is selected; if not the record is passed.

*Multiple field interlock (M.F.I.).*—An entry hub that provides for the selection of a record if one of several Search Fields indicates a selection. The input required is the last column of each Search Field as provided by the Tape Block Column Counter. For example, if search field "A" includes columns 21 through 25 and search field "B" includes columns 36 through 45, then the M.F.I. hub must have inputs from columns 25 and 45 of the Tape Block Colunm Counter (through necessary coincident and incident units) to provide for selection on an OR basis.

*Stop Program.*—A "bottle plug" switch that provides for suspending machine operation after processing a given record. If bottle plugged the operation stops after the printing of each record. This provision is particularly useful on a File Search Operation if it is desired to alter the file search control information after each successive Selected Record. An Electronic Selector may be utilized for this function by identifying a specific record and controlling the pick of the selector from this information. After a Stop Program, the machine may be restarted by depressing the Start button on the operator's panel.

*Block column counter reset.*—An entry hub that permits reset and recycling of the Block Column Counter by control panel wiring. For a common application the Reset hub is used in conjunction with the Block application. For example, assume that the individual records are 100 characters in length. The Reset hub is wired to "100" of the Block Column Counter to reset the counter after the 100th character is processed so that the 101st character (actually the first character of the second grouped record) is indicated as character "1" by the counter. Reset may also be controlled with a given character. This requires the use of an Electronic Selector which is controlled by character recognition from the Tape Emitter hubs. The Column Counter Reset feature permits reduction of control panel wiring and effectively increases control panel capacity.

*Plug to C.*—Exit hubs that provide a constant output (+10 volts) for use in the electronic section of the control panel. Some common uses are: to common hubs of Electronic Selectors; to condition unused inputs of coincidents units that are not completely filled with logic signals; and to the Stop Program Hub.

FIXED FIELD OPERATION

Figure 1A:
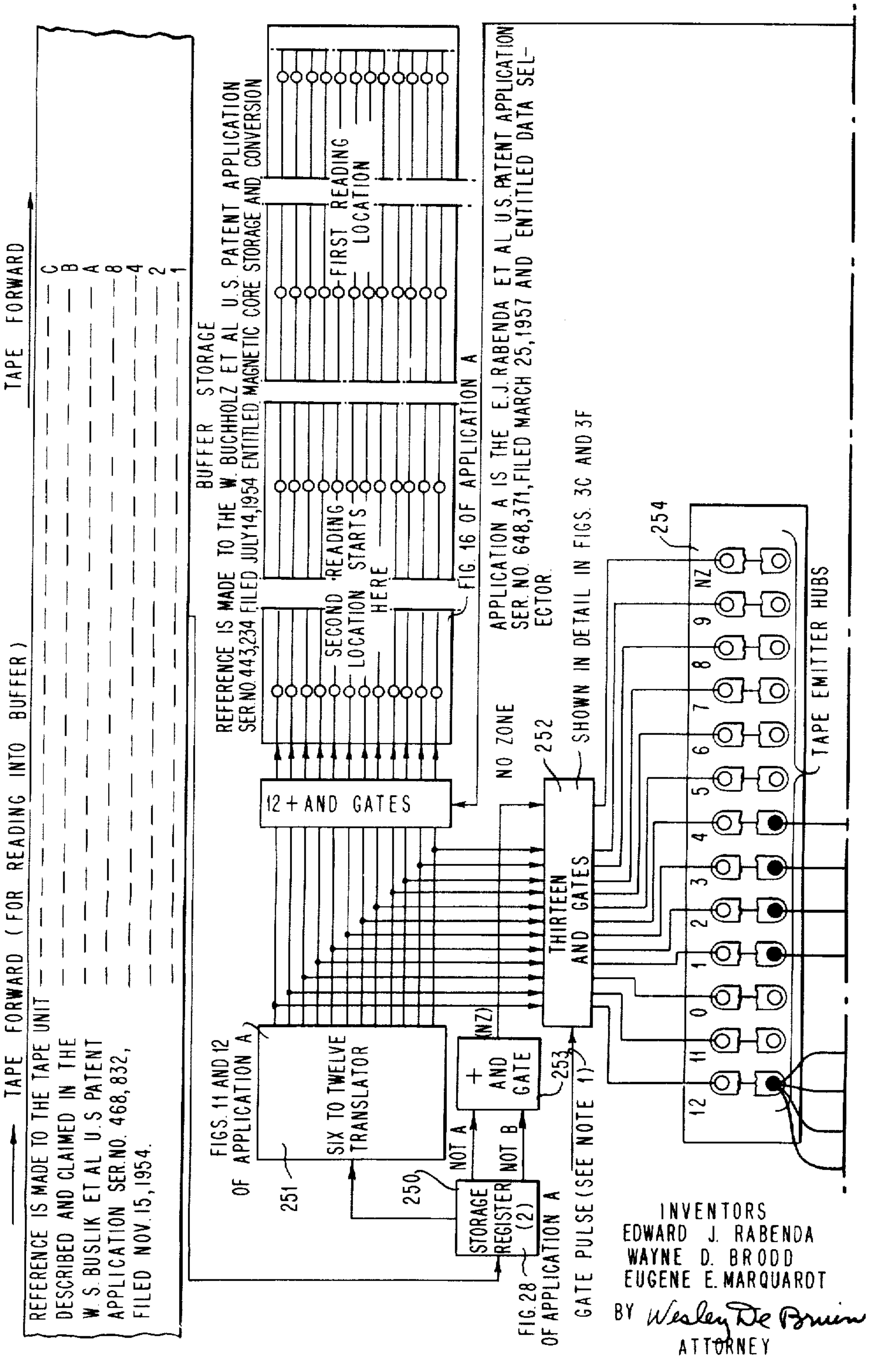
FIGURES 1A, 1B and 2 are to be arranged to disclose the circuitry and structure of the File Search Tape Data Selector as employed in an illustrative Fixed Field Operation.
Figures 1, 2:
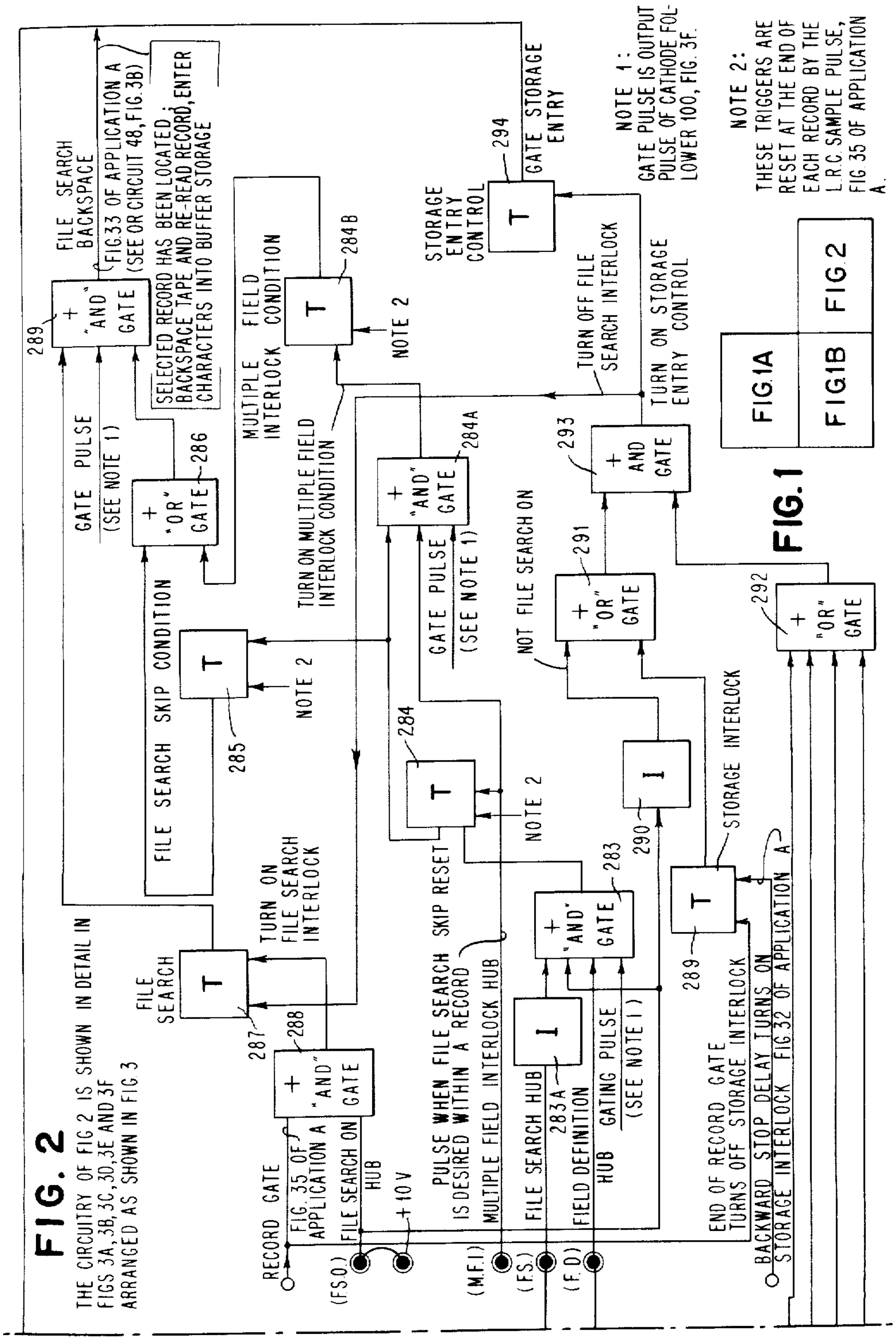
FIGURE 1 shows how

Referring to FIG. 1, a File Search operation for alphabetic characters A, B, C, D, in column 5, 6, 7 and 8, respectively, of any record, will be described. The Tape motion is illustrated in the upper portion of FIG. 1A. The Tape Unit is of the type shown and described in the W. S. Buslik et al., U.S. patent application, Serial Number 468,832, filed November 15, 1954. As the tape is read, the character read is transmitted to storage register (2), identified by reference character 250 in FIG. 1A. As more fully explained in the E. J. Rabenda et al. U.S. patent application (application A). Each character is then transmitted from storage register (2) to the six-twelve translator 251, as more fully explained in the E. J. Rabenda et al. U.S. patent application (application A). Thus the characters, as read from the tape are sequentially transmitted to the translator 251, FIG. 1A.

Figure 1B:
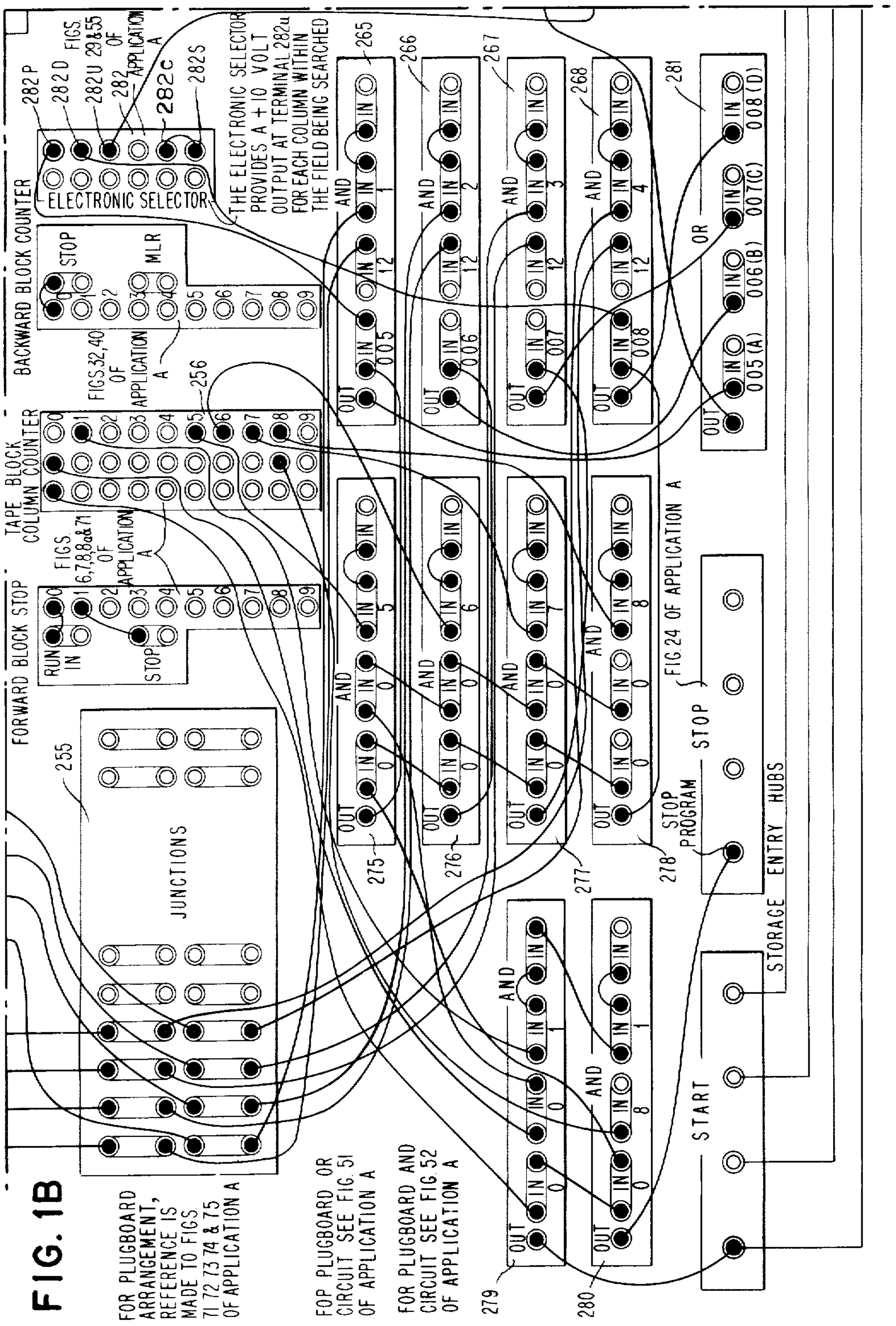

The characters are then sequentially transmitted from the translator 251 to the thirteen AND gates 252, FIG. 1A. Storage Register (2) is also coupled to AND gate 253, FIG. 1A, by the leads identified as "NOT A" and "NOT B" in FIG. 1A. Thus the presence of a "NOT A" ($\overline{A}$) and a "NOT B" ($\overline{B}$) condition results in an output from AND gate 253 which is the NO ZONE INDICATION. The thirteen AND gates 252 provide an output to the tape emitter hubs 254, FIG. 1A. The output from the tape emitter hubs, 254, represent each tape character in Hollerith code. The selected output of the tape emitter hub is shown (FIGS. 1A and 1B) going to junctions 255, FIG. 1B. Each junction of junctions 255, FIG. 1B, is merely a bus hub which provides a convenient outlet for the tape emitter. It is apparent that the junctions 255 may provide an increased number of outputs from each tape emitter hub.

To File Search for the characters A, B, C, and D in the specific columns, (namely 5, 6, 7 and 8) it is necessary to obtain a sequential notation. This sequential notation is obtained from the Tape Block Column Counter as described below. As the tape moves forward each specific character thereon is read. As explained in detail in the Rabenda et al. U.S. patent application (application A) the Tape Block Column Counter advances one position as each character is read from the tape. Thus after five characters have been read, the Tape Block Column Counter will have advanced five positions, or to 005, if it had started from 000. Briefly, it is desired to provide an output from the Tape Block Column Counter, corresponding to columns 005, 006, 007 and 008 of each record, or a selected record, that can be combined with the output from the tape emitter hubs in such a manner that AND circuit 265, FIG. 1B, can recognize if column 005 had a 12 and a 1 therein; AND circuit 266, FIG. 1B, can recognize if column 006 had a 12 and 2 therein; AND circuit 267 can recognize if column 007 had a 12 and 3 therein; and AND circuit 268 had a 12 and 4 therein. It is to be appreciated that in Hollerith code an A is represented by a 12 and a 1, a B is represented by a 12 and a 2, a C is represented by a 12 and a 3, and a D is represented by a 12 and a 4. Then the output from AND circuit 265 will appear only if an A is located in column 005; the output from AND circuit 266 will appear only if a B is located in column 006, the output from AND circuit 267 will appear only if a C is located in column 007 and the output from AND circuit 268 will appear only if a D is located in column 008. In other words: column 005 is inspected for an A, which is a 12–1 code in Hollerith code; column 006 is inspected for a B, which is the 12–2 code in the Hollerith code; column 007 is inspected for a C, which is the 12–3 code in the Hollerith code; and column 008 is inspected for a D, which is the 12–4 code in the Hollerith code. The interconnection of AND circuits 275, 276, 277, 278, 279 and 280, as in FIG. 1B provides the necessary sequence from the Tape Block Column Counter. AND circuits 275, 276, 277 and 278, respectively provide: a single output when 005 of the Tape Block Column Counter is conditioned positive; a single output when 006 of the Tape Block Column Counter is conditioned positive; a single output when 007 of the Tape Block Column Counter is conditioned positive; and a single output when 008 of the Tape Block Column Counter is conditioned positive. The outputs of AND circuits 275, 276, 277 and 278 are respectively "ANDed" in AND circuits 265, 266, 267 and 268. The outputs of AND circuits 265, 266, 267 and 268 are respectively the inputs to OR circuit 281. The output of OR circuit 281 is connected to the File Search Hub, FIG. 2. Thus OR circuit 281, FIG. 1B, as described, provides positive outputs to the File Search Hub (F.S.), FIG. 2, if column 005 of the tape contained an A, if column 006 of the tape contained a B, if column 007 of the tape contained a C, and if column 008 of the tape contained a D. The "File Search Hubs," as shown in FIG. 2 are File Search On (F.S.O.), File Search (F.S.) and Field Definition (F.D.). The File Search On (F.S.O.) is connected, or plugged at the control panel, to a +10 volt. The impressing of a +10 volt potential on the File Search On Hub gates all file search circuitry on. Without this hub, File Search On, being plugged, the file search circuitry within the Tape Data Selector is inactive. In "Fixed Field Operation" of the Tape Data Selector, as is the case at hand, the Multiple Field Interlock Hub (M.F.I.) FIG. 2, is not plugged. (The Multiple Field Interlock Hub (M.F.I.) is plugged in a "Floating Word Search Operation" of the Tape Data Selector, as explained hereinafter.) The hubs labelled (F.S.) and (F.D.) in FIG. 2 are respectively the "File Search Hub" and the "Field Definition Hub." It is necessary for the File Search circuitry to pick, or energize, with a positive voltage condition, the Field Definition Hub (F.D.) FIG. 2 for the columns of the tape records which are to be examined. The Field Definition Hub is energized for each column within this group of characters, namely columns 005 through 008. In order to energize the Field Definition Hub, the Electronic Selector 282, FIG. 1B, is picked. From FIG. 1B it will be seen that hubs 282C and 282S of the Electronic Selector are connected by a plug wire. The plug hub 282P is connected to the output of AND circuit 275. The output of AND circuit 275, FIG. 1B, corresponds to column 005, and is impressed on hub 282P of Electronic Selector 282. Thus the Electronic Selector is picked when column 005 is read. The Electronic Selector picks when column 005 on the tape is read and it will not pick before then or after then. Likewise the Electronic Selector will drop out immediately subsequent to the reading of column 008 of the tape. The output of AND circuit 278, FIG. 1B, corresponds to column 008 and is impressed on terminal 282D of Electronic Selector 282. Thus the Electronic Selector is dropped out when column 008 is read. (The Electronic Selector is of the type fully described in the aforementioned E. J. Rabenda et al. application.) Briefly, the Electronic Selector is picked while columns 005 through 008 inclusive, of the tape is read. During this time, the reading of columns 005 through 008, inclusive, a +10 volt output is available at hub 282U of the Electronic Selector. This output from hub 282U of the Electronic Selector is impressed on the Field Definition Hub (F.D.) FIG. 2. Thus the Field Definition Hub (F.D.) FIG. 2 is conditioned positive on the reading of column 005 of the tape and thus condition is removed after the reading column 008 of the tape.

Now, as tape columns 005 through 008 are read, if the File Search Hub, FIG. 2 just above the Field Definition Hub, FIG. 2, receives a positive condition on the reading of tape column 005, we find this positive condition is inverted by Inverter 283A, FIG. 2, and precludes the conditioning of AND circuit 283, FIG. 2. This is now one of the features of the File Search Circuitry that is to be noted. In other words, if during the field definition condition, the File Search Hub is conditioned at each gate pulse, which is described in Note 1, FIG. 2, then AND circuit 283, FIG. 2 is not conditioned. Thus the requirements are that at gate pulse time, we must have a positive condition on the File Search Hub, if the Field Definition Hub is energized. Thus if the Field Definition Hub is conditioned positive and we do not have a positive condition on the File Search Hub, the output of the Inverter 283A is positive and AND circuit 283 is conditioned at gate pulse time. This is apparent from an inspection of FIG. 2 since one input of AND circuit 283 is conditioned from the FILE SEARCH ON HUB, at all times during a File Search operation. When AND circuit 283 is conditioned the gate pulse passes through AND circuit 283 and turns on the File Search Skip Trigger 284, FIG. 2. When the Field Skip Trigger is turned "on" it is an indication of that during at least one gate pulse time, within Field Definition Time, the File Search Hub was not conditioned positive. This is an important feature of the File Search Operation, namely at any time when the Field Definition Hub is conditioned positive and a gate pulse is received, the File Search Hub should be positive, otherwise, the gate pulse is allowed to turn the File Search Skip Trigger "ON." When the File Search Trigger is "ON" a tape skip over this record will result, as is fully disclosed in the above identified E. J. Rabenda et al. U.S. patent application. It is to be appreciated that a record on the tape that is skipped over is equivalent to a non-selected record.

Figures 3, 3F:
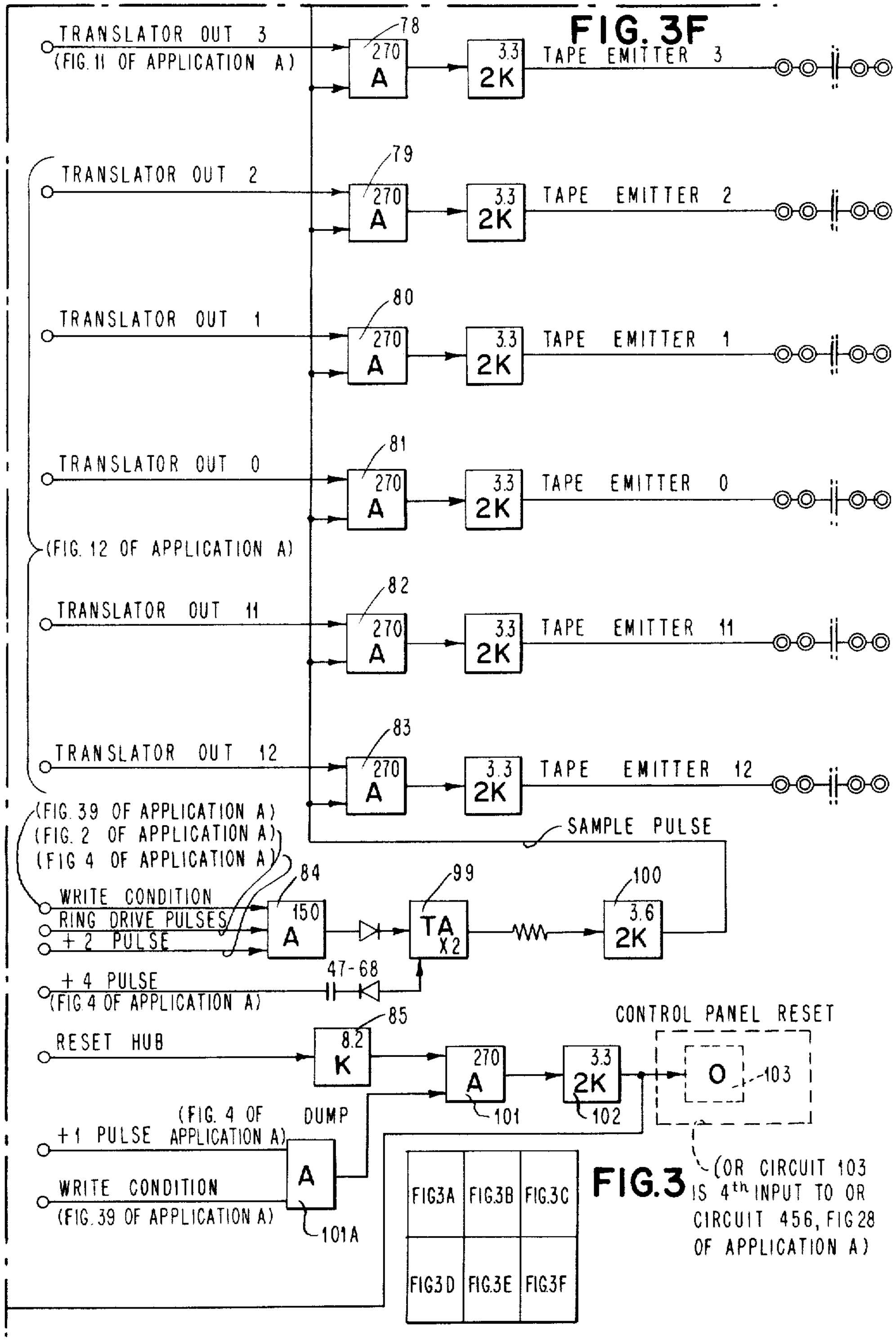
FIGURE 3 shows how
FIGURES 3A, 3B, 3C, 3D, 3E and 3F are to be arranged to disclose in detail the File Search Circuitry "per se" (of the File Search Tape Data Selector) as employed in a Fixed Field Operation and, or a Floating Word Operation.

The logical of FIG. 2 will be described in detail hereinafter when the FIG. 3 is described.

In this example, the File Search Circuitry, as stated earlier herein, is looking for the characters A, B, C, D in columns 005, 006, 007 and 008, respectively, of any record of the tape. If we found all the characters we were looking for, in the proper sequence in any record and in the specified record columns, (in other words, if we found the A in columns 005, the B in column 006, the C in column 007 and the D in column 008) then at no time was AND circuit 283 conditioned and consequently the File Search Skip Trigger remained in its "OFF" condition. Since the File Search Skip Trigger 284 remained in its "OFF" condition the File Search Skip Condition Trigger 285, FIG. 2, remained in its "OFF" condition. The "OFF" condition of the File Search Skip Condition trigger 285, FIG. 2 results in a positive input being impressed on the upper input of OR circuit 286, FIG. 2.

If we have not found each character in the columns that we were looking at (namely A, B, C and D, respectively, in columns 005, 006, 007 and 008 of a tape record) we would have turned "ON" the File Search Skip Trigger 284, FIG. 2 which would have turned "ON" the File Search Skip Condition trigger 286, FIG. 2. The reason for the two triggers, namely, the File Search Skip Trigger 284, FIG. 2 and the File Search Skip Condition Trigger 285, FIG. 2, is for additional observation of other columns in such operations as the Floating Word Operation described hereinafter. This will be appreciated when the Floating Word Operation and FIGS. 3 and 4 hereof, are described in detail hereinafter.

A positive condition on OR circuit 286, FIG. 2 is present, since at all times, during Field Definition time, we obtained a positive condition on File Search Hub (F.D.) FIG. 2. This means that we have found everything we were looking for, namely a tape record having an A in column 005, a B in column 006, a C in column 007, and a D in column 008. This record, having an A in column 005, a B in column 006, a C in column 007, and a D in column 008 is a Selected Record.

Once a Selected Record is located, the tape is backspaced at the end of the Selected Record and the Selected Record is read into the Buffer Storage Unit, shown in FIG. 1A, in the manner fully disclosed in the afore-identified E. J. Rabenda U.S. patent application. Briefly, the entry into storage of the Selected Record is accomplished by the pulsing of a Start plug hub, FIG. 1B and the subsequent pulsing of a Stop plug hub, FIG. 1B. The pulsing of the Stop and Start plug hubs, FIG. 1B is controlled by the Tape Block Column Counter and AND circuits 279 and 280, FIG. 1B. As seen from FIG. 1B the Tape Block Column Counter, and AND circuit 279, and the Start Plug Hub are so connected that the information of the Selected Record will be entered into storage beginning with column 001 thereof. In other words we see that "Start" is coming from the AND circuit 279, FIG. 1B, whose output corresponds to column 001 of the Selected Record. We will stop entry into storage with column 081 of the Selected Record. Again referring to FIG. 1B it will be seen that the Tape Block Column Counter AND circuit 280 and the Stop plug hub are so connected that the entry of information from the Selected Record into storage will be stopped with column 081 thereof. It is to be appreciated the Tape Block Column Counter must be plugged to stop entry into storage of column one beyond the last column of the record. In other words, if we employ 80 character (columns) records and we want to stop entry into storage with the 80th character (column) so we use the "081" of the Tape Block Column Counter for this Stop operation. The reading into storage of a Selected Record, including the plug wiring and the operation of the control circuitry including the Tape Block Column Counter are more fully disclosed in the afore-identified E. J. Rabenda et al. U.S. patent application.

Referring once again to the positive conditioning of OR circuit 286, FIG. 2, we find that AND circuit 288, FIG. 2, was conditioned by the Record Gate and the conditioning of this AND circuit resulted in the turning "ON" of the File Search Trigger 287, FIG. 2. With the File Search Trigger 287, FIG. 2, in its "ON" condition, the upper input of AND circuit 288 is conditioned. The lower input of AND circuit 288, FIG. 2, is conditioned since OR circuit 286, FIG. 2 is conditioned. Thus the Gate Pulse appiled to the center input of AND circuit 288, FIG. 2, conditions said AND circuit. When AND circuit 288, FIG. 2, is conditioned by the Gate Pulse, it renders an output pulse termed "File Search Backspace." The "File Search Backspace" condition is applied, as shown in detail in FIG. 3B hereof, to the circuitry of FIG. 33 of the afore-identified E. J. Rabenda et al. U.S. patent application. This condition, File Search Backspace, cooperates with the circuitry of the E. J. Rabenda et al. U.S. patent application, and the plug board wiring shown in FIG. 1B hereof, to effect entry into Buffer Storage, FIG. 1A, of the information contained in the Selected Record. Reference is made to the earlier discussion herein of the entry of the Selected Record into storage.

Briefly, once the Selected Record has been located, the tape is backspaced and the information from this record is entered into storage for subsequent processing. It will be appreciated that this sequence may be repeated a number of times, and a number of Selected Records located, and made available for processing.

Reference is made to the E. J. Rabenda et al., U.S. patent application, Serial Number 648,371, filed March 25, 1957, and entitled Data Selector. In a Fixed Field Operation of the Data Selector, as described above, the Forward Block Stop, FIG. 1B, is shown having a Run In of zero. In other words we are controlling, as explained in detail in the above identified E. J. Rabenda U.S. patent application, to run one tape record forward in a Fixed Field Operation. Thus we have Forward Block Stop "one" wired to Stop and since we need no run in for this operation, Forward Block Stop "zero" is wired to Run In. The Backward Block Counter, under the condition of File Search is always wired to "zero." The backward movement of the tape is controlled internally on a File Search Backspace condition so that there is no need to wire the Backward Block Counter to "one", back to zero on the File Search circuitry and the circuitry of the Data Selector, E. J. Rabenda et al. U.S. patent application, accomplishes a single record backspace as required for a Fixed Field Operation. It is now apparent that the Data Selector in a Fixed Field Operation may be employed to locate a tape record having particular bits of information in particular, or chosen, preselected columns thereof.

The description of a Floating Word Operation, set forth hereinafter, will teach how a particular sequence of characters (alphabetic and, or numeric, or otherwise) may be located in any group of columns of any record of a tape, and how this particular sequence of characters is entered into storage for subsequent processing.

*File Search Circuitry (Fixed Field Operation and Floating Word Operation)*

Figure 3A:
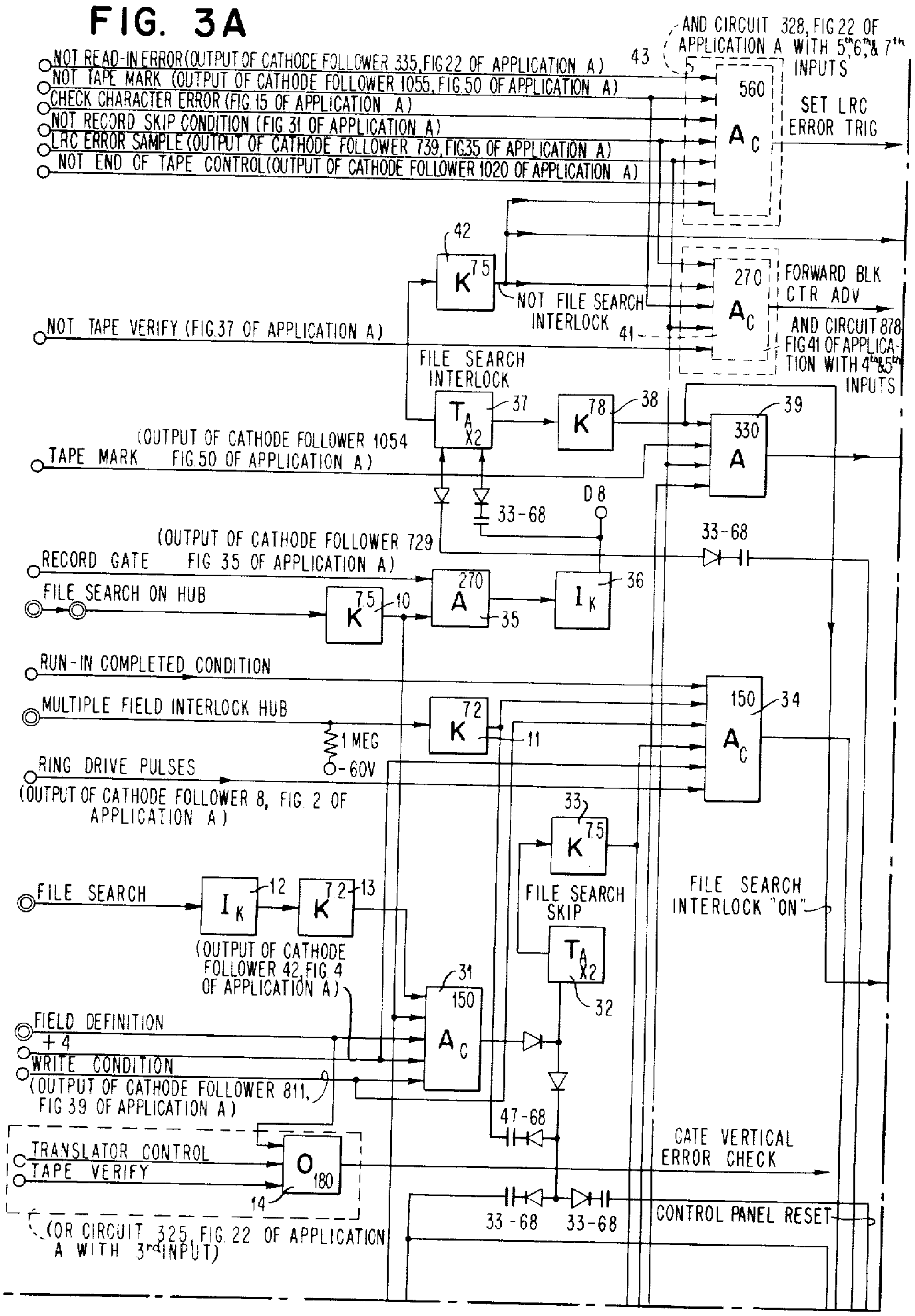
Figure 3C:
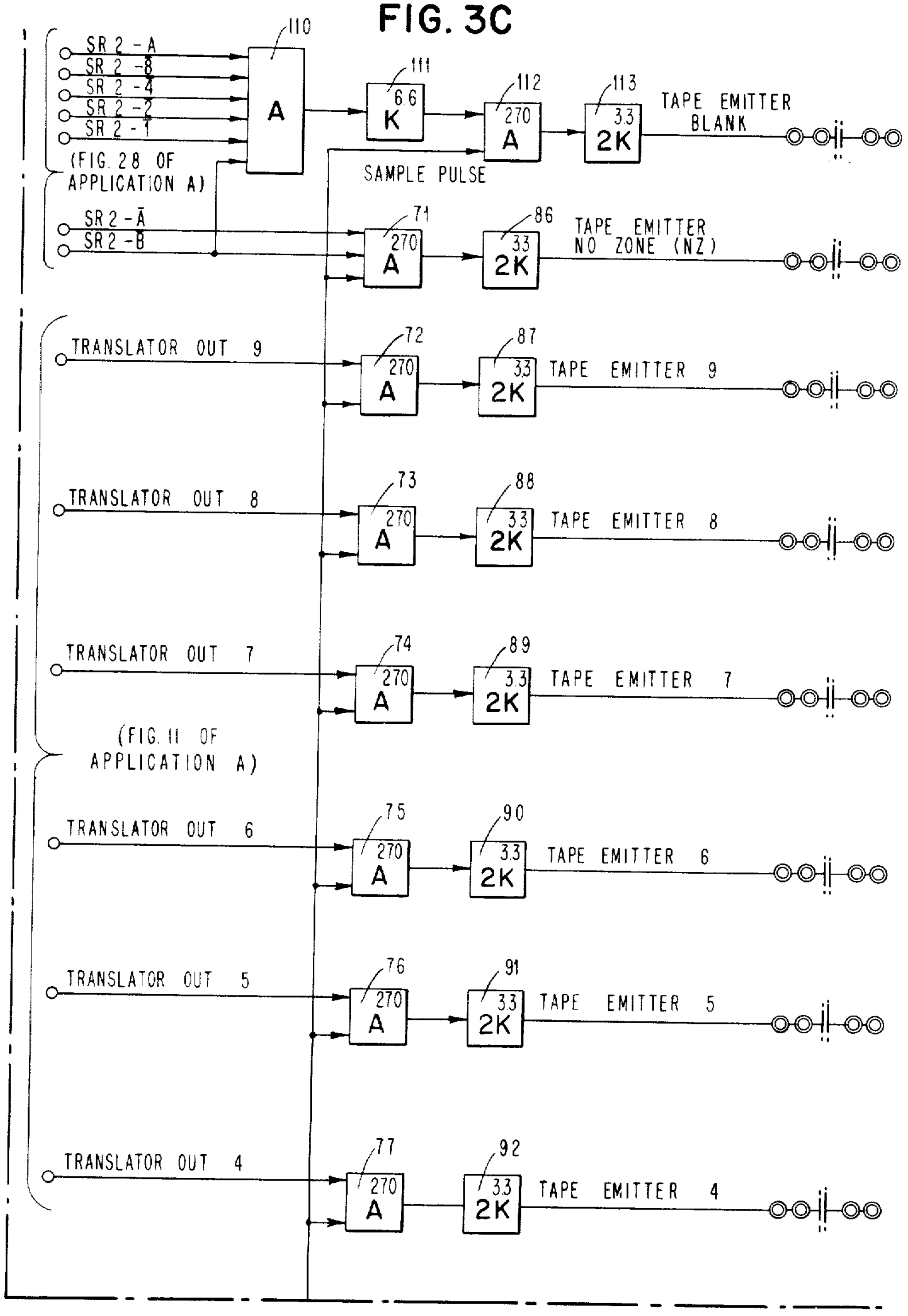
Figure 3B:
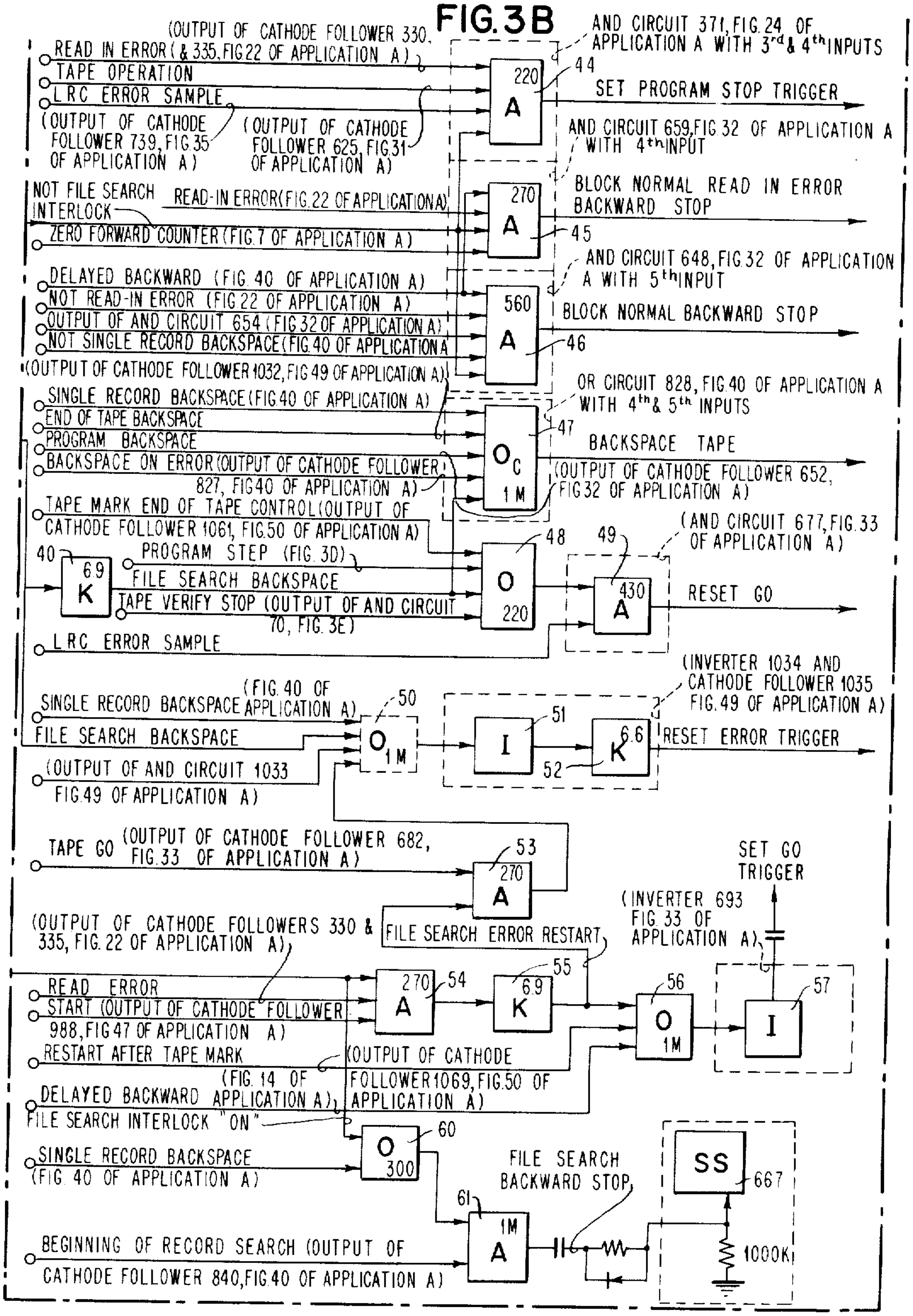

Reference is made to composite FIG. 3 and in particular to FIG. 3A thereof. The signal "Record Gate" is obtained from FIG. 35 of application A and conditions the upper input of AND circuit 35, FIG. 3A. (All references to figures of application A employed in the specification and in the drawings of this application refer to application A defined as follows: the E. J. Rabenda et al. U.S. patent application, Serial Number 648,371, filed March 25, 1957 and entitled Data Selector.) The other input of AND circuit 35, FIG. 3B, is conditioned from the File Search Hub (F.S.) FIG. 3A as plugged on the control panel of the Tape Data Selector (see FIGURES 1 and 4, hereof). When the File Search circuitry of the Tape Data Selector is employed the File Search ON hub (F.S.O.) FIG. 3A, has a positive potential thereon as a result of plugging. The positive condition on the File Search Hub ON (F.S.O.) FIG. 3A is impressed via cathode folower 10 on the lower input of AND circuit 35, FIG. 3A. Thus we now condition AND circuit 35 (FIG. 3A) fully and consequently as the Record Gate rises we provide a positive input to the Inverter 36 (FIG. 3A). The inverted Record Gate turns on the File Search Interlock Trigger 37, FIG. 3A. The File Search Interlock Trigger provides the gating for the File Search Circuitry. In other words, most all the circuitry in the file search feature is controlled by the File Search On hub being plugged on the control panel.

Figure 3D:
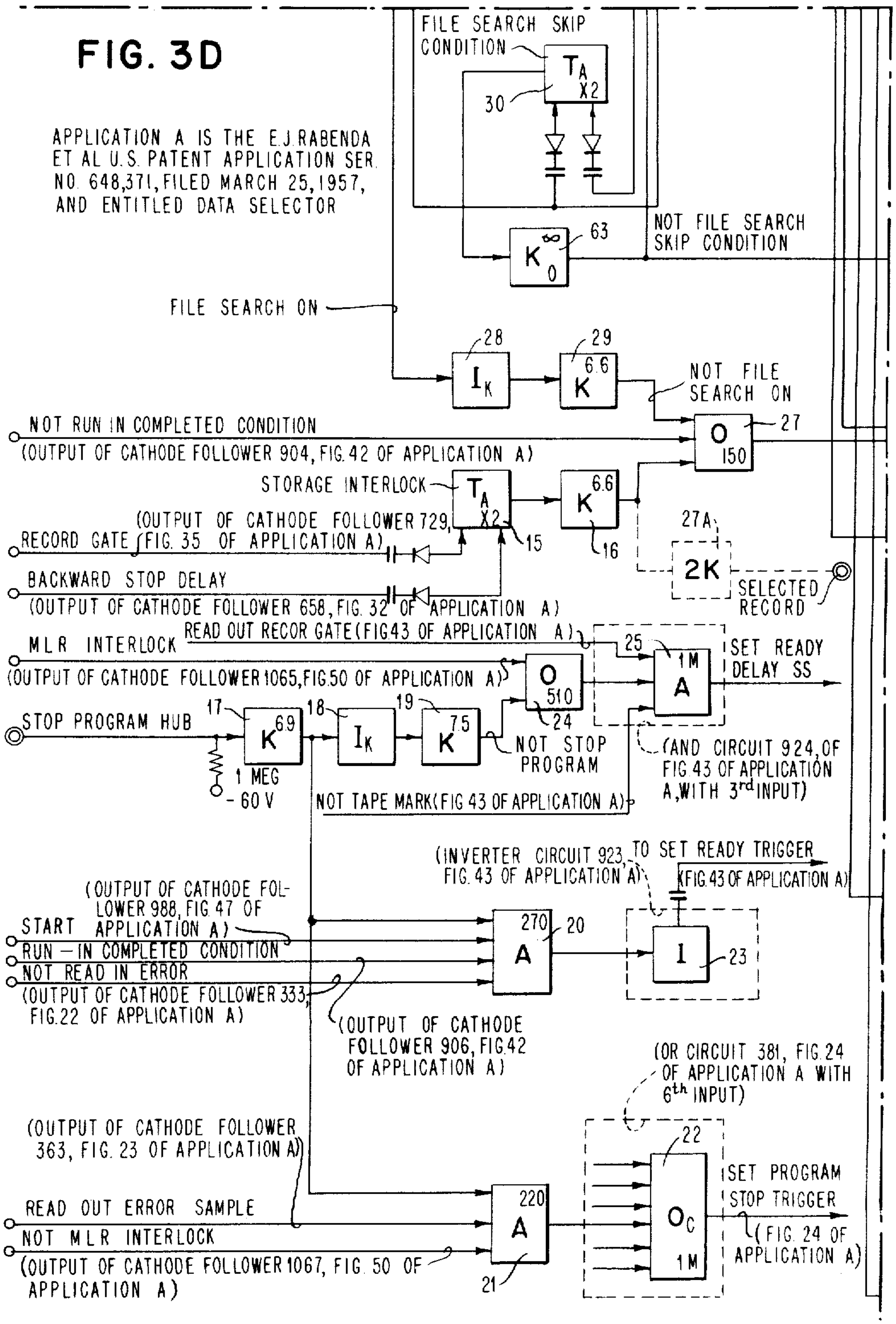

Reference is now made to FIG. 3D of composite FIG. 3, and in particular to the signal Backward Stop Delay obtained from FIG. 32 of application A. This signal Backward Stop Delay is applied to the Storage Interlock Trigger 15, FIG. 3D and turns this trigger "ON".

We will now proceed with a description of the File Search Circuitry in conjunction with a description of the actual operation thereof. As explained above, the File Search Interlock Trigger 37, FIG. 3A is turned "ON" by the Record Gate. Within the tape record we are examining particular columns for particular bits of information. This essentially a Fixed Field Operation as shown in FIG. 1 and discussed earlier herein. Thus the Field Definition Hub (F.D.) FIG. 3A, which is a File Search feature, is conditioned from a particular column of the tape record, as explained earlier herein. The conditioning of the Field Definition Hub results in the conditioning of the center input of AND circuit 31, FIG. 3A, and the upper input of OR circuit 14, FIG. 3A. As explained earlier herein, as the character in each column of the tape is identified, or recognized, we get a positive input, if the recognition was correct, into the File Search Hub (F.S.) FIG. 3A. The input positive, from the File Search Hub, is impressed on the input of Inverter 12, FIG. 3A which now produces a negative condition, or a minus 30 volts, on the input of Cathode Follower 13, FIG. 3A. Thus the output of Cathode Follower 13, FIG. 3A, which is impressed on the upper input of AND circuit 31, FIG. 3A, results in the precluding of the conditioning of AND circuit 31 each time a selected character in a predetermined column of the tape field is recognized. The first (upper) and third (center) inputs to AND circuit 31, FIG. 3A have now been defined. The second input of AND circuit 31, FIG. 3A, has a positive condition impressed thereon as long as the File Search ON hub (F.S.O.) is plugged on the control panel of the Tape Data Selector. From FIG. 3A it will be seen that Cathode Follower 10, FIG. 3A, is connected between the File Search ON Hub and the second input of AND circuit 31, FIG. 3A. To briefly summarize input one of AND circuit 31 is negative if a selected character was read from the tape, input two of AND circuit 31 is conditioned as long as the File Search ON Hub is plugged; and input three of AND circuit 31 is conditioned during Field Definition. The fourth input to AND circuit 31 is the "plus on four pulse" which is obtained from FIG. 4 of application A. (The "plus on four pulse" is obtained from the clock (FIG. 4) of application A.) The fifth input to AND circuit 31 is the "write condition" obtained from FIG. 39 of application A.

From the above discussion it is now apparent that a positive output from AND circuit 31, FIG. 3A, occurs on the rise of the "plus on four" pulse if the File Search ON Hub, FIG. 3A, is plugged and if an electrical manifestation of a selected character was not impressed on the File Search Hub, FIG. 3A. Thus if the selected character was not received (as evidenced by a positive electrical manifestation on File Search Hub, (F.S.) FIG. 3A) we get as an output from AND circuit 31 FIG. 3A, a positive condition. The positive output condition from AND circuit 31, FIG. 3A, turns "ON" the File Search Skip Trigger 32, FIG. 3A. The turning "ON" of the File Search Skip Trigger 32, FIG. 3A in effect says "File Search Skip," i.e. we have not found the record that we are looking for, or the character combination that we are looking for in the tape field as defined. The details of how a File Search Skip operation is accomplished, once the File Search Skip Trigger 32, FIG. 3A is turned "ON" are set forth in the above identified E. J. Rabenda et al. U.S. patent application.

If we had obtained a true recognition on the File Search Hub (F.S.) FIG. 3A, (in other words, if we found the character A in column 005 of the tape) the File Search Hub would be conditioned. As explained earlier herein the Field Definition Hub (F.D.) FIG. 3A would be conditioned at this time. However, when the input of Inverter 12 (FIG. 3A) is positive the output thereof and the output fo Cathode Follower 13, FIG. 3A are negative. The negative output from Cathode Follower 13 is impresed on input one of AND circuit 31 and precludes the conditioning of this AND circuit by the "plus on four" pulse. Consequently AND circuit 31 would not render a positive output condition and the File Search Skip Trigger 32, FIG. 3A would not be turned "ON." If we do not turn the File Search Skip Trigger 32 "ON," we obtain a positive output therefrom and we thus have a positive output from Cathode Follower 33, FIG. 3A. This positive output condition from Cathode Follower 33 is impressed on, and conditions, the fourth input of AND circuit 34, FIG. 3A. The first input of AND circuit 34 has impressed thereon a Run In Completed Condition. The Run In Completed Condition is obtained from FIG. 42 of application A. The second input of AND circuit 34, FIG. 3A is connected via Cathode Follower 11 to the Multiple Field Interlock Hub, FIG. 3A. The Multiple Field Interlock Hub is plugged, or employed only for a Floating Word Operation of the Data Selector. (A Floating Word Operation of the Data Selector is disclosed hereinafter.)

Figure 3E:
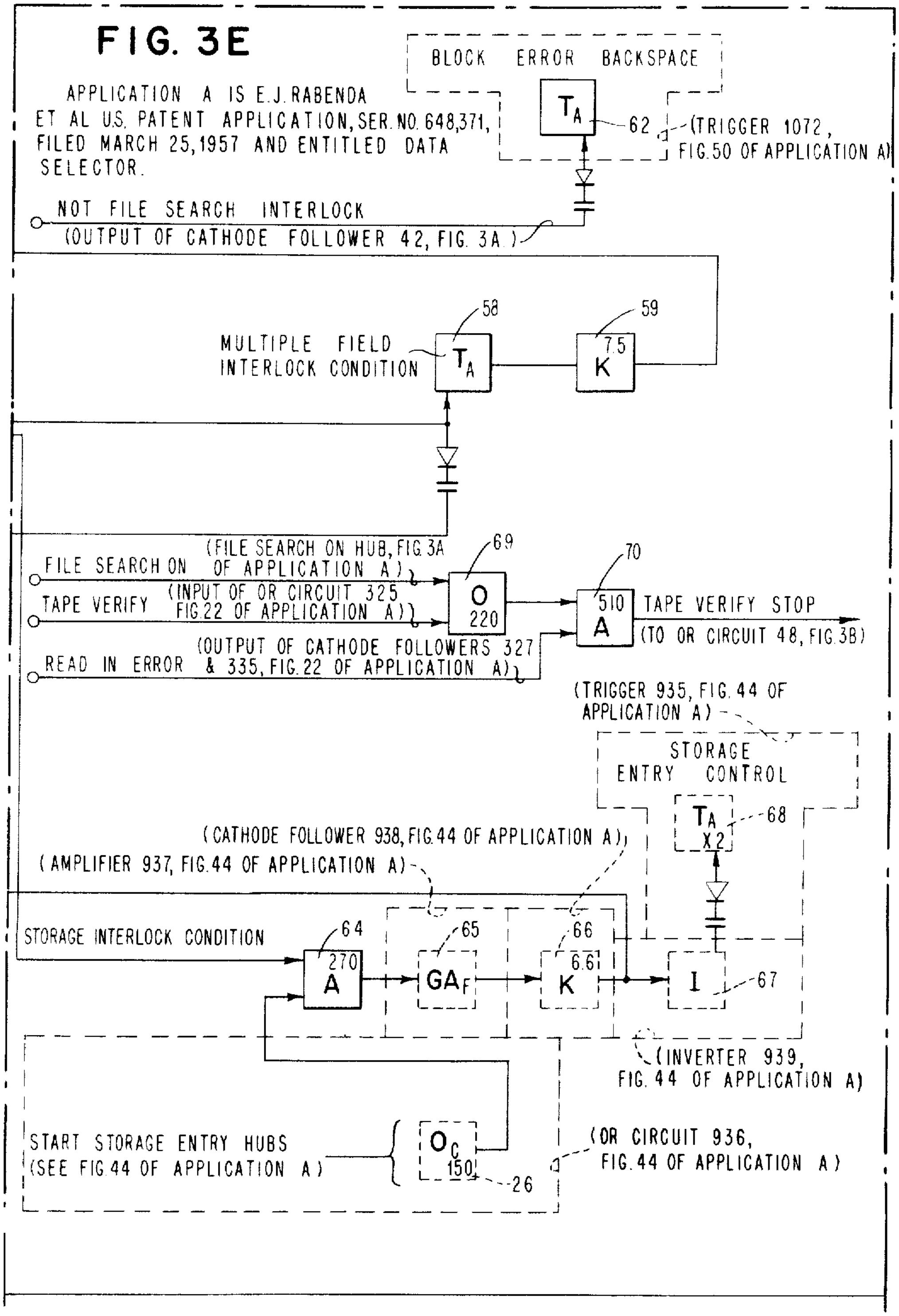

However, it is desirable to point out that the Multiple Field Interlock Condition, occurring during a Floating Word Operation, is employed to effect the conditioning of AND circuit 34, FIG. 3A and thereby turn "ON" the Multiple Field Interlock Condition Trigger 58, FIG. 3E. When the Multiple Field Interlock Condition Trigger 58, FIG. 3E, is ON, during a Floating Word operation manifesting that our first selection was incorrect, but the second selection, or the second word, is correct. It is apparent from the drawing that to turn "ON" the Multiple Field Interlock Condition Trigger 58, FIG. 3E, AND circuit 34, FIG. 3A must have been conditioned. The function of the Multiple Field Interlock Condition Trigger 58, FIG. 3E, will appear more clearly from the discussion hereinafter of Floating Word Operation of the Data Selector.

In a standard Fixed Field Operation, as described earlier herein, the Multiple Field Interlock Hub, AND circuit 34 and the Multiple Interlock Condition Trigger 58 are not employed.

However, if we do not turn "ON" the File Search Skip Trigger 32, FIG. 3A, which was the situation described previously, the output of Cathode Follower 33, FIG. 3A is positive. The positive output of Cathode Follower 33, FIG. 3A is applied to the right input of File Search Skip Condition Trigger 30, and maintains this trigger in its "OFF" condition. Briefly, if the File Search Skip Trigger is not turned "ON" the File Search Skip Condition Trigger 30, FIG. 3D will not be turned "ON." Namely, if the File Search Skip Trigger 32, FIG. 3A is never turned "ON," we will never obtain a negative condition applied to the right input of the File Search Skip Condition Trigger 30, FIG. 3D, to turn it "ON." Thus the File Search Skip Condition Trigger 30 will remain in its "OFF" condition as long as the File Search Skip Trigger 32 is not turned "ON."

With the File Search Skip Condition Trigger 30 in its OFF condition, the output of cathode follower OR circuits 59–63 (FIG. 3D) is a positive output labelled Not File Search Skip Condition in FIG. 3D. The output of Cathode Follower 59 is obtained from the Multiple Field Interlock Trigger 58, FIG. 3E. From FIGS. 3D and 3E it will be seen that the output of cathode Follower 63 is ORed with the output of the Multiple Field Interlock Condition Cathode Follower 59, so that even if we had turned "ON" the Multiple Field Interlock Condition Trigger 58, FIG. 3E, the output on the line labelled Not File Search Condition is produced by the File Search Skip Condition Trigger 30, FIG. 3D, being "OFF." The positive output of the File Search Skip Condition Trigger 30, namely, the Not File Search Condition is applied via Cathode Follower 63, FIG. 3D, to the fourth input of AND circuit 39, FIG. 3A. As explained more fully hereinafter this condition (Not File Search Condition) results in the condition of AND circuit 39, FIG. 3A, which renders a "File Search Backspace Condition" via cathode Follower 40, FIG. 3B to OR circuit 47, FIG. 3B. The File Search Backspace condition means recapitulating, that the File Search Skip Trigger 32, FIG. 3A did turn "ON," that the File Search Skip Condition Trigger 30, FIG. 3D did not turn "ON" and hence we do not want, but preclude a File Search Skip. In other words we want to read this record into storage, as outlined earlier herein, since this record is a Selected Record and we want to make it available for subsequent processing. A Selected Record as defined earlier herein is a tape record in which we have found all the characters searched for in the proper sequence in the selected columns thereof.

Now referring, once again to the positive condition, namely NOT FILE SKIP CONDITION impressed on the fourth input of AND circuit 39, FIG. 3A, we find that this AND circuit is conditioned thereby for the following conditions exist concurrently therewith. As explained earlier herein the File Search Interlock Trigger 37, FIG. 3A is "ON" and hence via Cathode Follower 38, FIG. 3A, the first input of AND circuit 39, FIG. 3A, is conditioned positive. The second input of AND circuit 39, FIG. 3A, has impressed thereon the signal "Tape Mark" obtained from FIG. 50 of application A. Further, since we are not at a tape mark on the tape, as explained in application A, the signal "Tape Mark" is positive and the second input of AND circuit 39 is conditioned. Impressed on the third input of AND circuit 39, FIG. 3A, is the L.R.C. Error Sample signal obtained from FIG. 35 of application A. As seen from FIG. 35 of application A the L.R.C. Error Sample is the Longitudinal Redundancy Check Error Sample. As the tape record is read we obtain the L.R.C. Error Sample, FIG. 3A, at the end thereof. The L.R.C. Error Sample effectively samples AND circuit 39, FIG. 3A, to determine if each of the three other inputs of said AND circuit have a positive condition thereon. If the three other inputs of AND circuit 39 are positive, the L.R.C. Error Sample passes through said AND circuit and results in a File Search Backspace signal appearing at the output of Cathode Follower 40, FIG. 3B. The File Search Backspace signal is impressed on one input of OR circuit 47, FIG. 3B (reference is made to FIG. 40 of application A) and results in a Backspace Tape condition, as more fully explained in application A. The File Search Backspace signal is also impressed via OR circuit 48, FIG. 3B, on the upper input of AND circuit 49. Thus AND circuit 49, FIG. 3B, is conditioned by the L.R.C. Error Sample impressed on the lower input thereof. When AND circuit 49, FIG. 3B, is conditioned, as explained above, it renders as an output a Reset GO signal. (Reference is made to FIG. 33 of application A.) The Reset GO signal, as explained in detail in application A, stops the forward motion of the tape. The File Search Backspace signal initiates a back spacing of the tape. Thus the Tape Data Selector is in a File Search Backspace Condition at this time. The File Search Backspace signal is also impressed on one input of OR circuit 50, FIG. 3B. The output of OR circuit 50, via Inverter 51, FIG. 3B, and Cathode Follower 52, FIG. 3B, is effective in precluding the rendition of a Reset GO signal, FIG. 3B.

As explained above, the File Search Backspace Condition has been initiated. Thus the tape is moved in a backward direction over the Selected Record, i.e., the record found to contain the characters searched for in preselected columns thereof. The tape is now moved in a forward direction and the information of the Selected Record is read into storage for subsequent processing by a Data Processing Machine such as an "IBM 407" or "IBM 519." This entire operation will appear more clearly from the description that follows.

Reference is made to the Storage Interlock Trigger 15, FIG. 3D. When the tape has stopped moving backward, that is when the tape has been backspaced over the Selected Record a Backward Stop Delay signal is impressed on the right input of Storage Interlock Trigger 15, FIG. 3D, turning said trigger "ON." The Backward Stop Delay signal is obtained from the output of Cathode Follower 658 of application A. With the Storage Interlock Trigger 15, FIG. 3D, in its "ON" condition the output of cathode Follower 16, FIG. 3D, is conditioned positive. The positive condition from Cathode Follower 16, which manifests that the Storage Interlock Trigger 15, FIG. 3D, is "ON" is impressed via OR circuit 27, FIG. 3D, on the upper input of AND circuit 64, FIG. 3E. Thus the upper input of AND circuit 64, FIG. 3E, is conditioned. The lower input of AND circuit 26, FIG. 3E is connected via OR circuit 26, FIG. 3E, to the Start Storage Entry Hubs on the control panel of the Tape Data Selector, and shown in FIGS. 1B and 4C hereof. Thus when the Storage Interlock Trigger 15, FIG. 3D, is "ON," an entry, or positive condition from the Start Storage Entry Hubs results in the conditioning of AND circuit 64, FIG. 3E. By the appropriate wiring of the Start Storage Entry Hubs, as explained earlier herein, the entire information, or selected portions of the information from the Selected Record is read into storage for subsequent processing. In other words, the entry, or positive condition from the Start Storage Entry Hubs conditions AND circuit 64, FIG. 3E. The conditioning of AND circuit 64 is impressed via amplifier 65, FIG. 3E, Cathode Follower 66, FIG. 3E, and Inverter 67, FIG. 3E, on the right input of Storage Entry Control Trigger 68, FIG. 3E. Thus the Storage Entry Control Trigger is turned "ON" and the information from the Selected Record, or any portion or portions thereof, as determined by the wiring of the Start Storage Entry Hubs, is read into storage for subsequent processing.

On the fall of the positive condition impressed on the Start Storage Entry Hubs AND circuit 64, FIG. 3E is deconditioned. When AND circuit 64 is deconditioned a negative condition exists at the output of Cathode Follower 66, FIG. 3E. This negative condition, from Cathode Follower 66, is impressed on the left input of the File Search Interlock Trigger 37, FIG. 3A and turns this trigger "OFF." By turning "OFF," the File Search Interlock Trigger 37, on the storage entry cycle of the tape, the file search circuitry is precluded from being active and consequently passing over the selected record (a second time), backspacing over the Selected Record (a second time) and reading the Selected Record into storage a second time and repeating this sequence. In other words, we would never be able to go forward if we did not turn "OFF" the File Search Interlock Trigger 37, FIG. 3A.

Thus on the storage entry cycle of the Selected Record the File Search Interlock Trigger 37, FIG. 3A, is turned "OFF." The File Search Interlock Trigger 37, FIG. 3A, is next turned "ON," on the rise of the Record Gate corresponding to the tape record following the Selected Record of the tape. Thus as soon as the Selected Record has been read, during a storage entry cycle, the File Search Interlock Trigger 37, FIG. 3A, is turned "ON" by the rise of the Record Gate passing through AND circuit 35, FIG. 3A and Inverter 36, FIG. 3A. Thus the File Search Interlock Trigger is "ON" in preparation for an inspection by the Tape Data Selector of the Tape record that follows the Selected Record in its location on the tape.

Reference is made to the Stop Program Hub, FIG. 3D. As explained in the E. J. Rabenda et al. U.S. patent application (application A) can be wired on the control panel of the Tape Data Selector so as to stop the Tape movement when certain predetermined bits of information are read from the tape. This feature of the Tape Data Selector is of particular utility when employed in conjunction with a File Search Operation, such as a Fixed Field Operation or a Floating Word Operation. When the Stop Program Hub (FIG. 3D) is energized the upper input of AND circuit 21, FIG. 3D is conditioned via Cathode Follower circuit 17, FIG. 3D. The second input of AND circuit 21, FIG. 3D, is conditioned by the Read-Out Error Sample, obtained from FIG. 23 of application A and indicating that a read out error has not occurred. The third input of AND circuit 21, FIG. 3D, is conditioned by a NOT M.L.R. Interlock signal obtained from FIG. 50 of application A. When AND circuit 21 is thus conditioned a Set Program Stop Trigger signal is conveyed via OR circuit 22, FIG. 3D, to FIG. 24 of application A.

The Set Program Stop Trigger signal, as explained in detail in application A, turns "ON" the Program Stop Trigger 387, FIG. 24 of application A, and results in a Program Stop Condition. As explained in detail in application A, the occurrence of a Program Stop Condition will stop the operation of the entire Tape Data Selector. Thus, it will be appreciated that, under the above recited conditions, an input to the Stop Program Hub, FIG. 3D, will produce a stop of the overall machine, namely, the Tape Data Selector.

Likewise, the Tape Data Selector is started again via AND circuit 20, FIG. 3D, after a normal stop, by: conditioning input one of AND circuit 20, FIG. 3D, from the Stop Program Hub; conditioning input three of AND circuit 20 with the Run-In Completed Condition from 42 of application A; conditioning input four of AND circuit 20 with the Not Read In Error Signal from FIG. 32 of application A; and impressing a Start Signal on input two of AND circuit 20, FIG. 3D. The start signal is obtained from FIG. 47 of application A, and as explained in application A and shown in FIG. 47 may be obtained by depressing a manual start key. The conditioning of AND circuit 20, FIG. 3D, via Inverter 23, FIG. 3D, turns "ON" the Set Ready Trigger 927, FIG. 43 of application A.

The Set Ready Delay signal, obtained from the output of AND Circuit 25, FIG. 3D, results from the Stop Program signal being impressed, via Cathode Follower 17, FIG. 3D, Inverter 18, FIG. 3D, Cathode Follower 19, FIG. 3D, and OR circuit 24, FIG. 3D, on the second input of AND circuit 25, FIG. 3D. As explained in detail in application A, the turning "ON" of the Set Ready Trigger 927, FIG. 43, of application A, and the rendition of the Set Ready Delay Signal, applied to the circuitry of FIG. 43 of application A, results in the Tape Data Selector resuming operation.

Reference is made to AND circuit 44, FIG. 3B, which is employed to effect a Program Stop on the occurrence of a Read-In ERROR. As will be apparent from FIG. 3B, AND circuit 44, FIG. 3B, can only be conditioned when a Not File Search Interlock Signal is impressed on input four thereof. The concurrent presence of the following four conditions, respectively, on the four inputs of AND circuit 44, FIG. 3B, are necessary for the conditioning thereof: input one the Read In Error signal; input two the Tape Operation signal; input three the L.R.C. Error Sample signal; and input four the Not File Search Interlock signal. Thus it is apparent that AND circuit 44, FIG. 3B, cannot be energized during a File Search Operation (i.e. when the File Search Interlock Trigger 37, FIG. 3A, is "ON") since a Not File Search Interlock signal is necessary for the conditioning of AND circuit 44. Briefly, with the File Search Interlock Trigger "OFF," the Program Stop Trigger (FIG. 24 of application A) will be turned "ON" by a read in error, resulting in a Reading In Error signal during tape operation.

Reference is made to AND circuits 45 and 46, FIG. 3B, hereof. These AND circuits require for conditioning the Not File Search Interlock signal, i.e. the File Search Interlock Trigger in its "OFF" condition. In other words, the operation of these AND circuits is to render the signal Block Normal Read In Error Backward Stop and the rendition of the signal Block Normal Backward Stop. These AND circuits 45 and 46, are inoperative during a File Search Operation since when the File Search Interlock Trigger 37, FIG. 3A, is "ON" a negative condition is impressed via cathode Follower 42, FIG. 3A, on one input of each of these AND circuits. Thus during a File Search Operation these AND circuits, 45 and 46, cannot be energized and hence the respective output signals thereof, are transmitted to the circuitry of FIG. 32 of application A.

The function of OR circuit 47, FIG. 3B, was described previously. Briefly its function is to provide a backspacing of the tape. The output of OR circuit 47, FIG. 3B, is employed as explained earlier herein and in application A to accomplish a backspacing of the tape. Thus when a File Search Backspace signal is conveyed via Cathode Follower 40, FIG. 3B, and OR circuit 47, FIG. 3B, a tape backspace operation is initiated.

The function of OR circuit 48, FIG. 3B, and AND circuit 49, FIG. 3B, were previously described. Briefly, their function is to reset the Tape GO Trigger 679, FIG. 33 of application A, i.e. to stop the motion of the tape. As seen from FIG. 3E the "Reset GO" signal is rendered by the conditioning of AND circuit 49, FIG. 3B, by the L.R.C. Error Sample signal (from FIG. 35 of application A) and the File Search Backspace signal. The Reset GO signal is applied to the circuitry of FIG. 33 of application A, where as explained in detail in application A, it results in stopping tape motion in the forward direction. The backspacing of the tape is accomplished as explained earlier herein.

Reference is made to AND circuit 54, FIG. 3B, hereof. The GO Trigger 679, FIG. 33 of application A is turned "ON" by the Set GO Trigger signal from Inverter 57, FIG. 3B. Input one of AND circuit 54, FIG. 3B is conditioned by the File Search Interlock Trigger 37, being in its "ON" condition. Input two of AND circuit 54, FIG. 3B, is conditioned by the Read-In Error signal obtained from FIG. 22 of application A. Input three of AND circuit 54, FIG. 3B, is conditioned by the Start signal obtained from FIG. 47 of application A. The Start signal may be obtained by depressing a manual start key (FIG. 47 of application A). When AND circuit 54, FIG. 3B, is thus conditioned a File Search Error Restart Signal is impressed, via Cathode Follower 55, FIG. 3B, and OR circuit 56, FIG. 3B, on the input of Inverter 57, FIG. 3B. The output signal from Inverter 57, FIG. 3B, turns "ON" the GO trigger 679, FIG. 33 of application A. The File Search Error Restart signal is also employed to condition input two of AND circuit 53, FIG. 3B. Input one of AND circuit 53, FIG. 3B, is conditioned by the Tape GO signal (obtained from FIG. 33 of application A) resulting from the GO trigger 679, FIG. 33 of application A, being in its "ON" condition. The output of AND circuit 53, FIG. 3B, results, via OR circuit 50, FIG. 3B, Inverter 51, FIG. 3B, and Cathode Follower 52, FIG. 3B, in a Reset Error Trigger signal being impressed on the circuitry of FIG. 49 of application A. Briefly, as explained in application A, the reset Error Trigger Signal resets the Error Trigger 329, FIG. 22 of application A. This sequence of operation occurs after the start key is depressed subsequent to the detection of a read-in error during a file search operation.

Reference is made to OR circuit 60, FIG. 3B hereof. As seen from FIG. 3B, OR circuit 60 is conditioned by a File Search Interlock "ON" condition obtained from the output of Cathode Follower 38, FIG. 3A. The output of OR circuit 60, during a File Search Operation, conditions input one of AND circuit 61, FIG. 3B. Thus when a Beginning of Record Search (B.O.R.) signal is obtained from FIG. 40 of application A, during a File Search Operation, AND circuit 61, FIG. 3B, is conditioned and a File Search Backward Stop signal is rendered thereby.

The File Search Backward Stop Signal, as shown in FIG. 3B, is impressed on the circuitry of FIG. 32 of application A. This signal, as more fully explained in application A, results in a backward stop of the tape motion during a File Search Operation. Briefly, the backward stop of the tape motion, during a File Search Operation results from a Beginning of Record Search signal.

As seen from FIG. 3E, the Block Error Backspace Trigger 62 (1072, FIG. 50 of application A), FIG. 3E is turned "ON" by a Not File Search Interlock signal from Cathode Follower 42, FIG. 3A. Thus as a normal File Search Operation is initiated by turning "ON" the File Search Interlock Trigger 37, FIG. 3E, the Not File Search Interlock signal is absent and the Block Error Backspace Trigger 62 (1072 of FIG. 50 of application A) remains in its "OFF" condition. The Not Block Error Backspace signal from Trigger 62, FIG. 3E, is employed by the circuitry of FIG. 50 of application A.

As seen from FIG. 3E, OR circuit 69 is conditioned by either a File Search ON signal or a Tape Verify signal. When OR circuit 69 is conditioned by either of the aforerecited signals input one of AND circuit 70, FIG. 3E, is conditioned. The second input of AND circuit 70 is conditioned by a Read-In Error signal obtained from FIG. 22 of application A. Thus during a File Search Operation, i.e. when the File Search ON Hub, FIG. 3A, is plugged, a Read-IN Error occurs, AND circuit 70, FIG. 3E, is conditioned and renders a Tape Verify Stop signal as an output. This Tape Verify Stop signal is impressed on one input of OR circuit 48, FIG. 3B and results in a File Search Backspace condition as explained earlier herein.

AND circuit 84, FIG. 3F, is employed to turn "ON" the Sample Generator Trigger 99, FIG. 3F. AND circuit 84 is conditioned by the concurrent occurrence of the following conditions: The Write Condition from FIG. 39 of application A on input one; a Ring Drive Pulse from FIG. 2 of application A on input two; and a "plus two pulse" from FIG. 4 of application A. The reason for employing both the "plus two pulse" and the "Ring Drive pulse" for the conditioning of AND circuit 84 is that there is approximately a half pulse duration from the time that the "plus two pulse" arrives until the next "Ring Drive Pulse" arrives. This gives a delay in turning "ON" the Sample Generator Trigger 99, FIG. 3F, of approximately one half of a Plus Clock Pulse, which is in the order of a two microseconds delay, due to the Ring Drive Pulses acting as the conditioning factor on AND circuit 84. As shown in FIG. 3F the "plus four pulse" is used to turn the Sample Generator Trigger 99 "OFF." Thus the trigger 99, FIG. 3F, is used as a Sample Generator to produce an output from a delayed "plus two pulse" until the fall of the "plus four pulse." Hence this Sample Generator 99, is a "trigger" of approximately eight to ten microseconds in time duration, producing a positive output from the Cathode Follower 100, FIG. 3F. The Sample Pulse from the Sample Pulse Generator Trigger 99, FIG. 3F, is impressed on input two of each of the AND circuits 71 through 83 and 112, FIGS. 3C and 3F. The Sample Pulse passes through each AND circuit, of AND circuits 71 through 83, FIGS. 3C and 3F, which has a translator output conditioning positive the input one thereof, at the time of the sample pulse. For example, assume that the Translator Out (8), FIG. 3C, is conditioned positive at Sample Pulse time, then Cathode Follower 88, FIG. 3C will render a Tape Emitter 8 positive output. This would provide a tape emitter output on the control panel hub of the Tape Data Selector representing the tape character "8" occurring at this time. The Tape Emitter NO Zone signal coming from the output of the Cathode Follower 86, FIG. 3C, is generated by the conditioning of AND circuit 71, FIG. 3C. The conditioning of AND circuit 71, FIG. 3C, is obtained from the output of Storage Register 2, FIG. 28 of application A, and consists of a NOT A($\overline{A}$) condition, a NOT B($\overline{B}$) condition (obtained from FIG. 28 of application A) and the Sample Pulse. This automatically means that if we have the NOT A($\overline{A}$) and the NOT B($\overline{B}$) conditions this tape character is not an alphabetic character; it must be a numeric or other character. Thus the presence of the Tape Emitter NO Zone signal positively indicates that the tape character was not an alphabetic letter. The Tape Emitter Blank signal is obtained by conditioning AND circuit 110, FIG. 3C, AND circuit 110, FIG. 3C, is conditioned by the following conditions occurring concurrently: the Not 1($\overline{1}$) condition; the Not 2($\overline{2}$) condition; the Not 4($\overline{4}$) condition; the Not 8($\overline{8}$) condition; the Not B($\overline{B}$) condition; and the A(A) condition. The signals representing these conditions are obtained from Storage Register (2), FIG. 28 of application A. We now pass through AND circuit 110 and have a condition representing only an A bit being read from the tape. This in the binary coded decimal system employed herein represents the code for a blank on the tape. In other words, the A bit, along, on the tape represents a blank, i.e. rather than just the lack of any tape bit at all, an A bit is put in its place on the tape. The Tape Emitter Blank signal passes through Cathode Follower 111, FIG. 3C and is gated through AND circuit 112, FIG. 3C, by the Sample Pulse. Thus via Cathode Follower 113, FIG. 3C, a Tape Emitter Blank positive output signal is transmitted to the corresponding control panel hub of the Tape Data Selector.

The Reset Hub, FIG. 3F, is employed in the Floating Word Operation in conjunction with the Multiple Field Interlock Hub, FIG. 3A. The Reset Hub when impulsed, conditions, via Cathode Follower 85, FIG. 3F, the upper input of AND circuit 101, FIG. 3F. AND circuit 101, FIG. 3F, is conditioned by a Dump signal impressed on input two thereof. The Dump signal is obtained, as seen from FIG. 3F, by ANDing the "plus one pulse" and the Write condition in AND circuit 101A, FIG. 3F. The Dump signal will be further described hereinafter. Thus AND circuit 101, FIG. 3F, produces an output upon receipt of an impulse from the Reset Hub at a time controlled by the Dump signal. The output of AND circuit 101 is termed Control Panel Reset and is impressed, via Cathode Follower 102 on one input of OR circuit 103, FIG. 3F (OR circuit 456 of application A). The Control Panel Reset signal accomplishes, or effects, a reset of the Tape Block Column Counter to the condition of 000 output. Also, as seen from FIG. 3, the Control Panel Reset signal is employed to turn "OFF" the File Search Skip Trigger 32, FIG. 3A. This reset now allows the File Search Skip Trigger to be turned "OFF" if it had been turnd "ON" previously. Meaning, that we had been searching for the word SCREW or BOLT; we were not successful in locating the word SCREW or BOLT; and thus had turned "ON" the File Search Skip Trigger. We now turn the File Search Skip Trigger back "OFF" by the Reset Hub being pulsed from a particular condition, ANDed with the Tape Block Column Counter. Thus, as the Tape Block Column Counter is reset the File Search Skip Trigger is reset. Thus with the Tape Block Column Counter reset to 000, we will resume the searching job.

If the File Search Skip Trigger 32, FIG. 3A, had been turned "ON" and is now turned "OFF," the File Search Skip Trigger 30, FIG. 3D will be turned "ON." Hence in order to obtain an output now, we have to use the Multiple Field Interlock Condition Trigger 58, FIG. 3E. If we obtain an output from Cathode Follower 11, FIG. 3A, representing a Multiple Field Interlock Hub, positive condition, we condition input two of AND circuit 34, FIG. 3A. Since we had a Run In Completed Condition, obtained from FIG. 42 of application A, the first input of AND circuit 34, FIG. 3A is conditioned positive. As stated above the second input of AND circuit 34 is conditioned by an impulse from the Multiple Field Interlock Hub. The third input of AND circuit 34 is conditioned by the Write condition obtained from FIG. 42 of application A. The fourth input of AND circuit 34, FIG. 3A, is conditioned by the File Search Skip Trigger 32, FIG. 3A, being in its "OFF" condition and allowing a gate to pass through AND circuit 34, FIG. 3A. The "plus four pulse" is impressed on the fifth input of AND circuit 34 and is used as one part of the gate. The other part of the gate is the Ring Drive Pulse, applied to the sixth input of AND circuit 34, which automatically delays the output of AND circuit 34, one half of a clock pulse duration (or approximately a delay of two microseconds) from the rise of the "plus four pulse." Thus when the conditions described occur, the Multiple Field Interlock Condition Trigger 58, FIG. 3E, is turned "ON" by a positive gate from AND circuit 34. This provides a positive output from cathode follower (OR circuit) 59, FIG. 3E, so that even though the output of cathode follower (OR circuit), FIG. 3E, is now in a negative condition, the positive condition of cathode follower OR circuit 59 overrides this and provides a positive gating action on input four of AND circuit 39, FIG. 3A. This allows us to come through AND circuit 39 and obtain a File Search Backspace even though we have turned "ON" the File Search Skip Condition Trigger 30, FIG. 3D, previously. This is a feature of the File Search Data Selector with Floating Word Operation, namely, that we have to use the Multiple Field Interlock Condition Trigger 58, FIG. 3E, to override the "ON" condition of the File Search Skip Condition Trigger 30, FIG. 3D.

A general description of the overall operation of File Search circuitry of FIG. 3 will now be set forth. The first thing to do to make the File Search Circuitry operative is to plug the File Search On Hub, which is on the control panel. When we have this plugged, we also have to select by ANDing and ORing the Field Definition control, and the File Search Control. Assuming Fixed Field Operation, we will not have to be concerned with the Multiple Field Interlock Hub.

So upon proper Field Definition and File Search we have the control panel wired and tape motion is started. Upon recognizing the first record, the Record Gate is turned "ON" which turns "ON" the File Search Interlock Trigger 37, FIG. 3A. The File Search Interlock Trigger 37 is used to provide most of the gating and degating during a File Search operation. It is used to allow a tape backspace etc., without the plugging of Backward Stop on a control panel to "one" we are now able to go back one record.

Now the tape is moving, and assume, for example, the characters of A, B, C and D. We desire to select a record if these characters are stored in columns 005, 006, 007 and 008, respectively, thereof. The Field Definition Hub has been wired to obtain from the Electronic Selector (on the control panel) a positive condition beginning with column 005 and ending after column 008. Now we also provide AND circuits that combine column 005 with the "A" tape emitter combination, in other words, the "12" and the "1" of the Tape Emitter Hubs. An output from these AND circuits passes through an OR circuit and is impressed on the File Search Hub. Now, whenever the Field Definition control is conditioned positive, we must have an input on the File Search Hub, otherwise, we turn "ON" the File Search Skip Trigger 32, FIG. 3A. If we turn "ON" the File Search Skip Trigger 32 the negative shift of the OFF side thereof, produces a turn "ON" of the File Search Skip Condition Trigger 30, FIG. 3D. The "ON" condition of the File Search Skip Condition Trigger 30 degates or deconditions Cathode Follower 63 and so prevents a File Search Backspace via AND circuit 39 and Cathode Follower output 40, FIG. 3B. Briefly, we can say that if the File Search Skip Trigger is turned "ON," the File Search Skip Condition Trigger will be turned "ON," representing a record in which we did not find the proper combination of characters in the columns we were interested in. If we had found the combination of characters in the selected columns, we would not have gotten through AND circuit 31 to turn "ON" File Search Skip Trigger 32, and consequently File Search Skip Condition trigger 30. If we did not turn "ON" the File Search Skip Condition Trigger 30, we would condition AND circuit 39. Thus at the end of the record, when the LRC Error Sample signal appeared, we would provide an output representing File Search Backspace. This means that we have located within this tape record the characters we were interested in, within the columns in which they should be located. Thus we would like to process this record, through the core storage of the Data Selector and process the record representing this tape record on the "IBM 407" or "IBM 519." The Storage Interlock Trigger 15, FIG. 3D governs the entry of storage information. It is turned "ON," after we have backspaced the one tape record, by the Backward Stop Delay. It is turned "OFF" by a Record Gate. Thus as we go through a File Search Backspace we turn "ON" the Storage Interlock Trigger which now gates any start storage entry pulses from the start storage entry hubs on the control panel through OR circuit 26, FIG. 3E. These pulses turn "ON" the Storage Entry Control Trigger 68, FIG. 3E, allowing us to enter information into the core storage under control of the start storage entry hubs on the control panel. The Storage Interlock Trigger 15, FIG. 3D, is used only in a File Search Operation. The OR circuit 27, FIG. 3D, has an input representing Not File Search On. This condition is up, or positive, when we are not doing a File Search Operation. This condition, via OR circuit 27, provides a gating of AND circuit 64 for the storage entry control, so that all information now under control of the start, stop storage entry hubs on the control panel can be utilized. During a File Search Operation the output of Cathode Follower 29, FIG. 3D, is conditioned negative, and so we need a substitute, via OR circuit 27, to provide the gating of AND circuit 64. This substitute condition is obtained, via Cathode Follower 16, from Storage Interlock Trigger 15, FIG. 3D.

We will now briefly describe a Floating Word Operation where we are looking for the characters A, B, C and D, in any four successive columns of a tape record. In other words, a Selected Record will be a record containing A, B, C and D in any consecutive columns thereof. The order is set up by the Tape Block Column Counter wired from 001 through 004. We provide a reset input to the Reset Hub of the Tape Block Column Counter from an Electronic Selector which in effect says, after we have sampled four columns, let us begin looking anew at the information from the tape. Assume that the word, or the characters, A, B, C, D are stored in columns 10, 11, 12 and 13, respectively, of a tape record. On the recognition of any "A" character we would energize a selector which would provide a Field Definition Condition on the Field Definition Hub. We now must provide an input to the File Search Hub. The Tape Block Column Counter has been reset and the output thereof namely, 001, is ANDed with character A from the Tape Emitter Hubs. If this is true, we have found character A, and an input is provided on the File Search Hub. This input on the File Search Hub prevents the turning "ON" of the File Search Skip Trigger 32 for this first character. As we proceed to column 002 of the Tape Block Column Counter we are now saying that we will accept a "B" if it occurs in this position. Therefore, a "B" is ANDed on the control panel. If column 002 of the tape manifested a "B" we provide an input to the File Search Hub and again decondition AND circuit 31. Once again with AND circuit 31 deconditioned the File Search Skip Trigger 32 is not turned "ON." Now let us assume that column 003 did not have a "C" therein, but had the letter K, or some other character, therein. The Field Definition Hub has a positive condition thereon, but we do not get a positive input to the File Search Hub. As a result thereof the "plus four pulse" would pass through AND circuit 31 and turn "ON" the File Search Skip Trigger 32, FIG. 3A, which in turn would turn "ON" the File Search Skip Condition Trigger 30, FIG. 3D. Now, if these were the only triggers employed, we would not for this record be able to subsequently obtain, through AND circuit 39, FIG. 3A, a File Search Backspace condition. Thus, as explained earlier, and briefly repeated below, we provide means for allowing us to continue searching through this tape record. This means includes the circuitry for impressing a pulse on the Reset Hub of the Tape Block Column Counter to turn the Tape Block Column Counter back to 000 whenever we recognize the character "A" (which is the first character of the sequence for which we are looking). The File Search Skip Condition Trigger 30, FIG. 3D has been turned "ON." Assume that in any subsequent column of the tape record we now recognize another A. This second "A" character resets the Tape Block Column Counter, via the Reset Hub thereof, to 000. From the previous Field Definition, we covered a field of four characters. We impulsed the Multiple Field Interlock Hub at the end of every field we examined. As stated earlier herein, when we start looking at a field we reset the column counter to 000 and when we get 004, the drop off of 004 resets the Field Definition Condition back to zero. We also impulsed the Multiple Field Interlock Hub at the drop off of 004. Now, the impulse of the Multiple Field Interlock Hub means that if the File Search Skip Trigger 32 is in its "OFF" position we can come through AND circuit 34 and turn "ON" the Multiple Field Interlock Condition Trigger 58. The Multiple Field Interlock Condition Trigger 58 now serves as a substitute for the fact that we had not located within this record, as yet, a true grouping of characters in A, B, C and D, in that order. The Multiple Field Interlock Hub is impulsed from the last column count of each Field Definition. In other words, if we are looking at four characters, then, each time, on the drop off of the fourth character, we will impulse the Multiple Field Interlock Hub.

Now, let us assume, that in reading the tape we located, or recognized, still another character "A." This immediately pulsed the Reset Hub which rest the File Search Trigger 32 through the negative shift circuit. We now have a positive condition on the output of cathode follower 33, FIG. 3A. Now if we go through a sequence of A, B, C, D in that order, we do not get through AND circuit 31 to turn "ON" the File Search Skip Trigger. Thus, when we get to the last character in the field, or character 4, by the impulsing of the Multiple Field Interlock Hub, we come through AND circuit 34, and, as explained below, obtain a File Search Backspace Condition. From the above it is seen that the File Search Data Selector has the ability to locate the correct sequence of characters, no matter where they occur, or how many prior partial sequences it was necessary to examine.

Briefly, when we found the correct sequence of characters we were able to come through AND circuit 34, to turn "ON" the Multiple Field Interlock Condition Trigger 58 and thereby provide the necessary gating of AND circuit 39. We had previously lost the output of the File Search Skip Condition Trigger 30 because we had turned it "ON." Now the Multiple Field Interlock Condition substitutes for it and tells us that we had gone through a grouping of characters, or a field, without having any error in the sequence we had determined. As a result of not having an error, we are able to get through AND circuit 34 and turn on the Multiple Field Interlock Condition Trigger 58, thereby gating through AND circuit 39 and providing the File Search Backspace Condition. Hence, in a Floating Word Operation where we initially recognize only the first portion of the characters of the word we are looking for, by use of the Multiple Field Interlock Condition Trigger 58, we still have the ability of subsequently recognizing the complete word, or character sequence we are searching for.

*Floating Word Search Operation*

Figures 4, 4D:
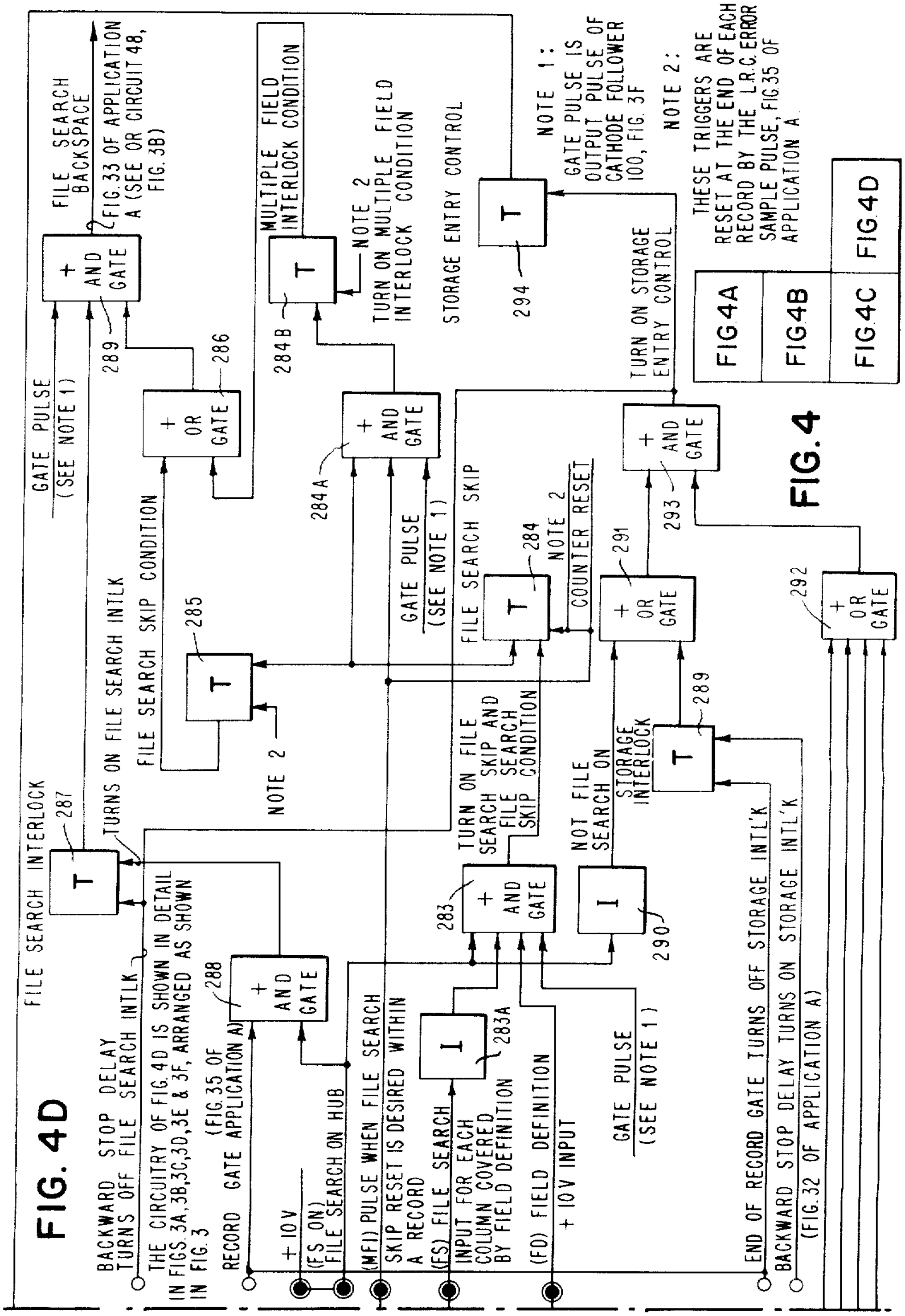
FIGURE 4 shows how
FIGURES 4A, 4B, 4C and 4D are to be arranged to disclose the circuitry and structure of the File Search Tape Data Selector as employed in an illustrative FLOATING WORD OPERATION.
Figure 4A:
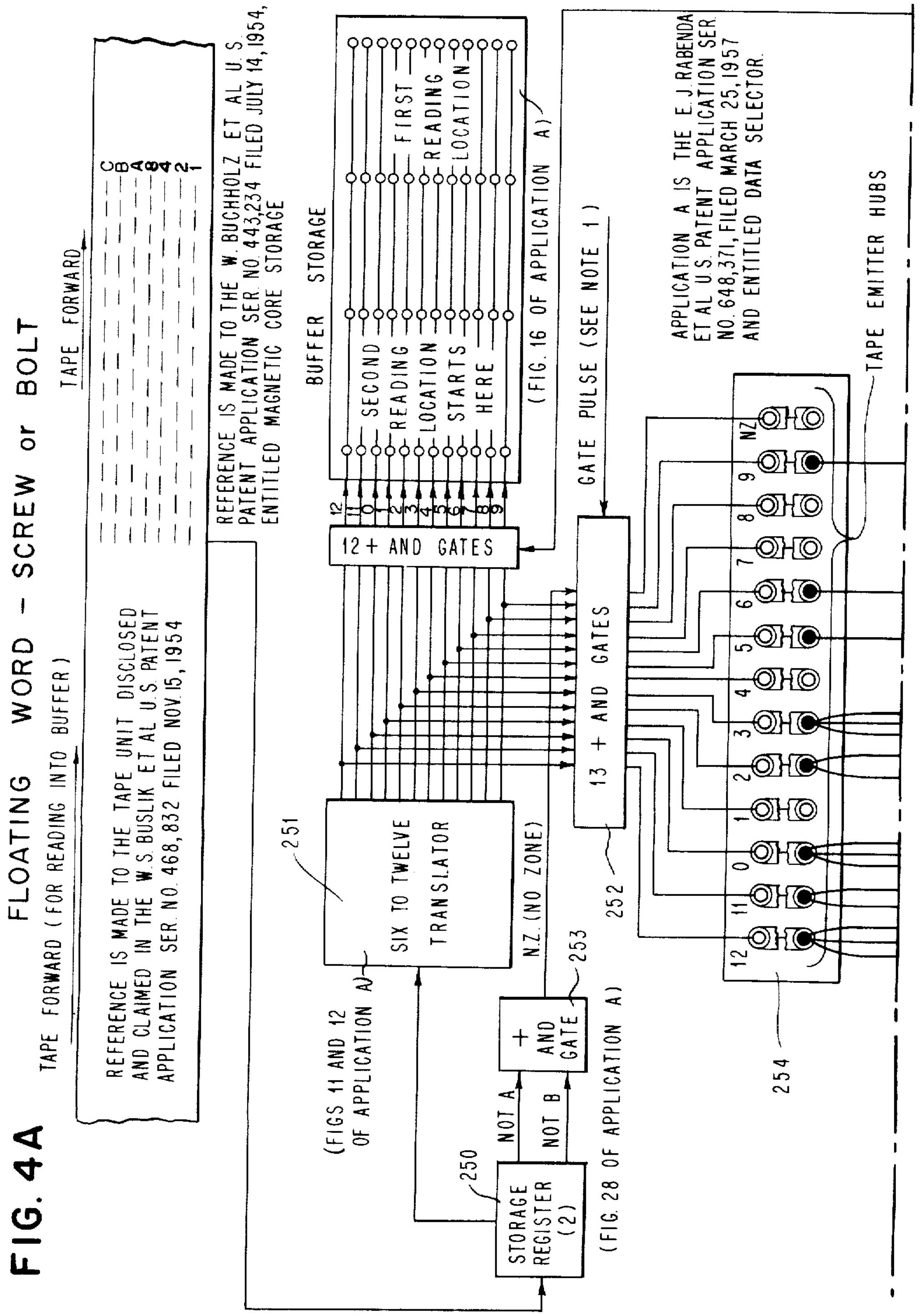
Figure 4B:
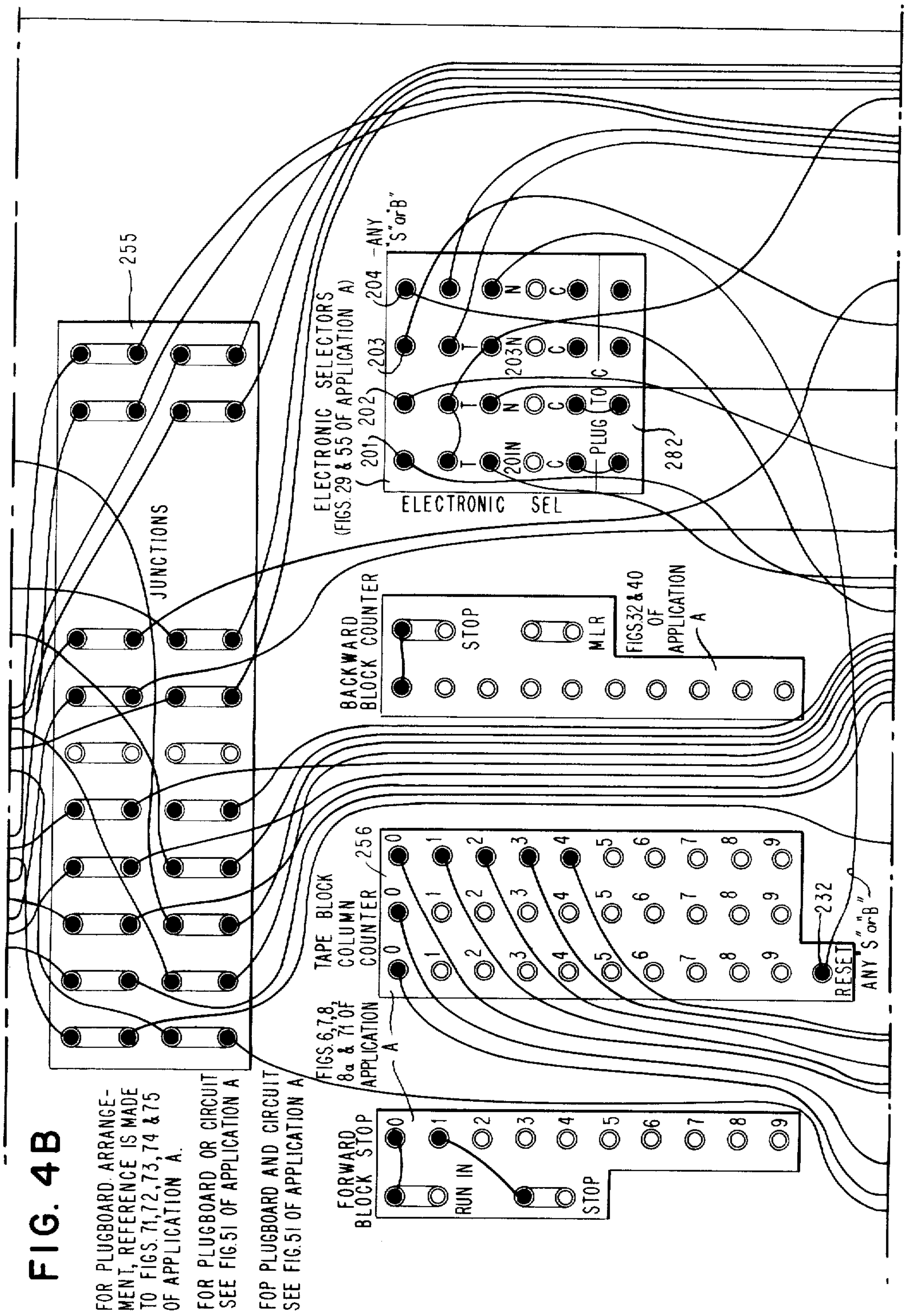
Figure 4C:
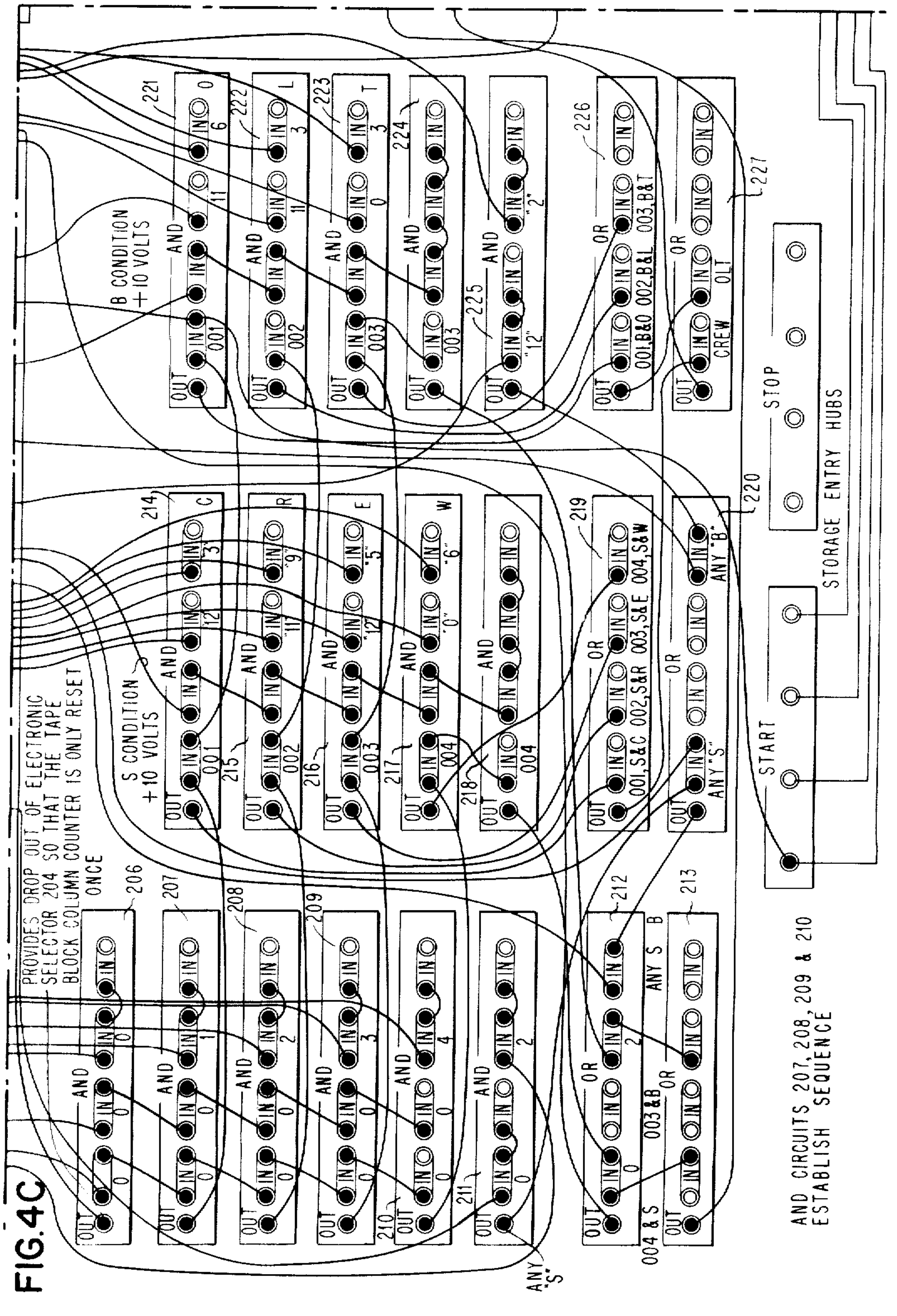

The File Search Operation, "Floating Word Search" operation, for the words "screw" or "bolt" in any sequential columns of a tape record will now be described. Reference is made to FIGURE 4 of the drawing. The information is read from the tape record into Storage Register (2) 250, FIG. 4A. The information is then transferred from Storage Register (2) 250 to the six to twelve Translator 251, FIG. 4A and appears, via AND Gates 252, FIG. 4A, in Hollerith Code at the Tape Emitter Hubs 205, FIG. 4A. The output of the Tape Emitter Hubs, FIG. 4A, is combined to perform the necessary character recognition of the characters "CREW" and "BOLT," as shown in AND circuits 214 through 217, FIG. 4C, and AND circuits 221 through 223, FIG. 4C. The character S is recognized in AND circuit 211, FIG. 4C, by connecting AND circuit 211, the Tape Emitter Hubs "0" and "2," which represent the character "S" in Hollerith Code. The output of the AND circuit now represents any "S" which was recognized from the tape record. This output is inserted into OR circuit 220, FIG. 4C. The character B, which is the first character of the optional word "Bolt," which we are searching for in the Floating Word Operation, is combined in AND circuit 225 by connecting into the Tape Emitter Hubs "12 and 2," representing in the Hollerith code the character "B". The output of AND circuit 225, representing any "B" recognized on the reading of the tape, is now introduced into OR circuit 220, FIG. 4C. The output of OR circuit 220, FIG. 4C, is now provided by any "S," or any "B" recognized on the tape. This output is connected to OR circuit 212, FIG. 4C. This output is also connected to Hub 204 (any "S" or "B") of Electronic Selector 282, FIG. 4B. As a result thereof Electronic Selector 282 produces a positive condition on the Reset Hub 232 of the Tape Block Column Counter, FIG. 4B. A positive condition on the Reset Hub 232, of the Tape Block Column Counter 256, FIG. 4B, whenever the proper gating conditions exist as explained earlier in the description of the circuitry of FIG. 3, results in a resetting of the Tape Block Column Counter 256, FIG. 4B. We have now explained the circuitry immediately initiated upon the recognition of the reading of an "S" or "B" from the tape.

Let us assume that we have recognized the character "S" as occurring on the tape record. We now want to successively examine the tape output to see whether, or not, we have consecutively the characters C, R, E and W. If we do have this condition then we can say that this is a Selected Record in that we have now located the word "SCREW" in a tape record. Let us now examine how we may obtain and recognize the word "SCREW" in a consecutive manner from the tape record. AND circuit 211, FIG. 4C, produces an output for any "S." This is the condition which originally starts the cycle of searching for the remaining characters, namely, C, R, E and W in this example. This output was transferred to OR 220.

The output of OR 220 is connected to one input of OR 212, and is also bussed to pick up Electronic Selector 204. This selector, as stated earlier, performed a reset of the Tape Block Column Counter 256, to the condition of 000. Thus we now are beginning with an output of 000 from the Tape Block Column Counter. The next tape character to read will advance the Tape Block Column Counter 256 to the output 001. We recognize the combinations of outputs from the Tape Block Column Counter 256, in AND circuits 206 through 210, FIG. 4C. AND circuit 206, FIG. 4C, produces an output at the time that the Tape Block Column Counter 256 is reset to 000. The output from AND circuit 206 is employed to "drop out" Electronic Selector 204. The output of AND circuit 206 is used only for the "drop out" of Electronic Selector 204 and provides a Tape Block Column Counter reset, so that the Tape Block Column Counter does not receive multiple resets, internally gated. The Tape Block Column Counter will reset to 000; as the next tape character appears it will transfer to 001 and will perform no additional resets beyond that point unless a new character "S" is recognized. We now have in AND circuit 207, FIG. 4C, the output of the Tape Block Column Counter 001. This output 001 now represents the next character, consecutively, after the "S" character was recognized. The output of AND circuit 207 goes to one input of AND circuit 214 in which we have also as inputs, the "12" from the Tape Emitter and the "3" from the Tape Emitter, representing in Hollerith code, the character "C," or in other words, the alphatbetic character "C" in Hollerith Code. The "S" condition was established from output of AND circuit 211 representing the fact that an "S" had been recognized. The output of AND circuit 211 is connected to one input of OR circuit 220. The output of AND circuit 211 also connected to the Electronic Selector 282 and produces a pick of Electronic Selector 201, FIG. 4B. The transfer point 201N of Electronic Selector 201 is now at a positive voltage and thus conditions one input of each of the AND circuits 214, 215, 216, 217, and 218, FIG. 4C, with an "S" condition, or +10 volts. It can now be appreciated that if we obtain an output from AND circuit 214, FIG. 4C, that we had obtained from column 001 of the tape the character "C." Proceeding to AND circuit 215, FIG. 4C, we can see, that we have "ANDed" in this AND circuit, Tape Block Column Counter 002, "S" condition, and a "11" and a "9" from the Tape Emitters representing the character "R" in Hollerith code. AND circuit 216, FIG. 4C, produces an output on column 003 of the Tape Block Column Counter, under an "S" condition, with a tape emitter "12" and a "5" representing the character E in Hollerith code. AND circuit 217, FIG. 4C, produces an output on column 004 of the Tape Block Column Counter, under an "S" condition, with a tape emitter "0" and a "6" representing the character W in Hollerith code. The outputs of AND circuits 214 through 217, as seen from FIG. 4C, are ORed in OR circuit 219, FIG. 4C. The output of OR circuit is impressed on one input of OR circuit 227, FIG. 4C. The output of OR circuit 227, FIG. 4C is impressed on the File Search Hub, FIG. 4D.

Thus, the File Search Hub, FIG. 4D receives positive impulses if we have located, or detected, the characters: C in column 001; R in column 002; E in column 003; and W in column 004. (In other words, when the above conditions exist the word SCREW has been found, or located, in a tape record.) So that for each of these columns the File Search Hub is impulsed with a postive condition. The Field Definition Hub, FIG. 4D is impulsed from the transfer point 203N of Electronic Selector 203, FIG. 4B. Electronic Selector 203, FIG. 4B, is picked by an output corresponding to column 001, from AND circuit 207, FIG. 4C. This means that as soon as the Tape Block Column Counter reaches the position column 001, we will proceed to pick Electronic Selector 203; thus positively gating the Field Definition Hub, FIG. 4D. The Field Definition Hub must now be "dropped out" at the end of the fieild we are looking for. If this filed has been established as the five character field for the word SCREW, or as the four character field for the word BOLT it must be dropped at the appropriate time. We consider that the character "S" or the character "B" represents the first position of the field, so that under the "S or B conditions" we do not immediately pick the Field Definition Hub. It is picked to cover the remaining characters in the word we are looking for, i.e. searching the tape record for. In other words, the Field Definition Hub would be impulsed to cover the columns 001, 002, 003 and 004 which would have in them characters C, R, E and W respectively. Thus Electronic Selector 203 is picked on Tape Block Column Counter output 001 and is "dropped" on Tape Block Column Counter 004 if we have obtained the "S condition."

As a result of energizing the Field Definition Hub, FIG. 4D, covering the four characters, CREW, and receiving an impulse into the File Search Hub, FIG. 4D, for each one of these characters, the File Search Circuitry, FIG. 4D, is energized to provide a File Search Backspace at the end of this record. In summary it is seen that during the conditioning of the Field Definition Hub an impulse was received at the File Search Hub for each of these characters. Under these conditions we now refer to this as a Selected Record. In this example a Selected Record is a tape record in which we have located the word SCREW.

The operation of the File Search Circuitry in locating the word BOLT in a tape record will now be described. If the character B is read in any tape column, the "12" and the "2" representing the character B in Hollerith code result in the conditioning of AND circuit 225. The output of AND circuit 225, FIG. 4C is impressed on one input of OR circuit 220, FIG. 4C. The output of AND circuit 225, FIG. 4C, is also employed to pick Electronic Selector 202. As a result, whenever we recognize the character B on the tape we proceed to pick Electronic Selector 202, FIG. 4B. Electronic Selector 202 is "dropped" via OR circuit 212 under the conditions of an "004" ANDed with an "S," or an "003" ANDed with a "B."

We will now proceed to explain the providing of the positive conditioning, under the "B condition," in AND circuits 221, 222, 223 and 224, FIG. 4C. The "B condition" is also used to pick Electronic Selector 204 which now provides an immediate impulse to the Reset Hub 232 of the Tape Block Column Counter 256, FIG. 4B. We now have provided upon recognition of the character B, a reset of the Tape Block Column Counter back to 000. With recognition of the succeeding characters on the tape this counter will successively render the outputs of 001, 002, 003, 004, etc. Going back to AND circuit 221 we now have the counter reset. The next character recognized, let us assume, is the character 0 which is a combination of an "11" and a "6" in Hollerith code. Thus AND circuit 221, FIG. 4C is conditioned and a positive condition is impressed on one input of OR circuit 226. AND circuit 222, FIG. 4C, provides an output if we recognize the character L (an "11" and a "3" in Hollerith code) in column 002, also under the "B condition." The output of AND circuit 222 is also impressed on one input of OR circuit 226. AND circuit 223, FIG. 4C, provides an output if we recognize the character T (an "0" and a "3" in Hollerith code) in column 003, also under the "B condition." The output of AND circuit 223 is also impressed on one input of OR circuit 226. The output of OR circuit 226 is impressed on the File Search Hub, FIG. 4D, as explained earlier herein, the Electronic Selector 203 is picked upon the Tape Block Column Counter reaching column 001. The picking of Electronic Selector 203 impressed a positive condition on the Field Definition Hub, FIG. 4D. An impulse was impressed on the File Search Hub, FIG. 4D, for each column 001, 002 and 003, representing recognition of the Characters O, L and T in the respective columns. Thus while the Field Definition Hub is energized, the File Search Hub received an impulse during each character, or column, time. A Selected Record has been located and a File Search Backspace operation is initiated, as explained earlier herein, to facilitate the reading of the information from this Selected Record into Buffer Storage for subsequent processing by a Data Processing Machine, such as the "IBM 407" or the "IBM 519."

It is now apparent that if the characters SCREW, in that order, or the characters BOLT, in that order, are found in any tape record we will select that record, as a Selected Record, for subsequent processing. This gives us the option of searching for a combination of characters in either of two words, such as the words SCREW or BOLT, for example. This means that if we had obtained the word SCREW, and not the word BOLT, we would have selected this record; and if we had obtained the word BOLT, and not the word SCREW, we would have selected this record. The selection of the record for either the word SCREW or BOLT is obtained by impulsing the Multiple Field Interlock MFI Hub, FIG. 4D, from the output of OR circuit 213, FIG. 4C. This impulse to the MFI Hub means that if we had obtained the conditions given in OR circuit 212, namely, the column 004 and an "S condition," or the column 003 and a "B condition," we would have impulsed the MFI Hub at the respective time of occurrence of column 004 or column 003, depending upon which condition we had obtained, i.e. whether it was the "S condition" or the "B condition." The MFI Hub (FIG. 4D), would have obtained a pulse at the end of that field. So that, if during that particular field search we had not found the characters that we were looking for, the failure to impulse MFI Hub would give us the option of going to the next group of characters and examining them successively to see whether or not this record should be selected. Without the provision of the MFI Hub and its associated circuitry and assuming that under the first pick of the Field Definition Hub we did not obtain the character combination which we were looking for, then the File Search Skip trigger would have been turned "ON," and we would have no convenient way of ever selecting within this particular record any other combination of characters, or further looking for this particular combination of characters that we did not get on the first pass, i.e. reading of the tape. Thus the MFI Hub provides, optionally, that if the first examination of characters turns out to be incorrect we continue examining the record for the character combinations we are looking for, each time impulsing the MFI Hub to see whether, or not, the combination that we had obtained is correct. If the Field Definition Hub has been impulsed, and during that Field Definition "Pick Up Time' the File Search Hub is impulsed for each character, then at the end of that field, the MFI Hub is impulsed and turns "ON" the Multiple Field Interlock Trigger as described earlier herein, in the description of FIG. 3 of the File Search Circuitry.

AND circuits 207 through 210, FIG. 4C, inclusive, establish the sequence of characters that we are looking for. They establish the condition for the character corresponding to column 001 to be examined. Immediately followed by the condition for the character corresponding to column 002 to be examined, and likewise as to the characters corresponding to column 003 and 004. This establishes the sequence of characters. This is the reason for combining in AND circuits 214 through 217, FIG. 4C, the characters C with column 001 and likewise through the character W with column 004. As seen from, FIG. 4C, AND circuits 221, 222 and 223 are correspondingly employed to establish the sequence of the characters O. L and T.

The modification to FIG. 4 to allow searching for a floating word "singularly," such as the word SCREW, over and above the aforedescribed operation of searching for either a combination of words such as SCREW or BOLT will now be described. Briefly we want to perform the operation of searching for the word SCREW, only, in any columns of a tape record. The primary modification to make to the circuit of FIGURE 4, is to remove the Tape Emitter Inputs to AND circuit, FIG. 4C, 225 representing "any B." This would automatically eliminate the possibility of the character "B" picking Electronic Selector 202 and thus providing a "B condition" in AND circuits 221 through 224, FIG. 4C. We have now restricted the circuitry to the "S condition" so that upon recognition of the character "S" we will perform the operation that was previously described. As described earlier, we insert into AND circuit 211, FIG. 4C, an "0" and a "2" representing the character S in Hollerith code. Thus output of AND circuit 211 now represents any "S" and only S. Hence the output of OR circuit 220 is now strictly limited to "any S," so that all conditioning which was previously done on either "any B" or "any S" is now limited strictly to the character S. Thus we can run through a File Searching Operation, searching for the word SCREW, and any other character, such as the character B which was previously employed to search for the word BOLT will now have no effect upon the File Search circuitry.

The main functional modification required to search for the one combination of characters rather than for the two, as described previously, is to prevent the pick of the Electronic Selector 202 on the first character of the second combination of characters. Briefly, in eliminating the output of AND circuit 225, we have limited the condition for picking Electronic Selector 204 to strictly the S character recognition. The character B no longer picks Electronic Selector 204, and consequently the reset of the Block Column Counter is now produced only by recognition of an S character on the tape. The output of the Electronic Selector 203 is now dropped out, from OR circuit 212, only on the 004 and S condition, since the third input to OR circuit 212, which is an 003 and a B condition, is now negatively conditioned. The second input to OR circuit 212, representing the S or B condition from OR circuit 220, is now conditioned only on the S condition. Therefore, the output of OR circuit 212 occurs only for an S condition or an 004 and an S condition. Thus, we have Floating Word File Search operation changed, from a OR condition of SCREW or BOLT, to the condition of searching for one combination of characters, which in the example chosen is the word SCREW.

A brief description of the additional versatility of a Tape Data Selector, of the type disclosed in the aforeidentified E. J. Rabenda et al. U.S. patent application (application A), when the File Search Circuitry disclosed herein is employed will now be set forth. Briefly, with the File Search Circuitry employed we have the ability to look for specific combinations of characters, or any combination thereof, or numerical information in any combination thereof, in either particular columns, or in any columns of the tape. By any columns we mean that we have the ability to do what we referred to earlier herein as a Floating Word Operation. In a Floating Word Operation we can search through a tape record for the specific combination of characters (alphabetic, numeric, or other such as an asterisk (*) or any combination thereof), that we are looking for, and upon finding this combination of character, or information, in any location on the tape record (not necessarily in specific columns but in consecutive columns), we make this record, a Selected Record, available for subsequent processing. The sequence of processing a Selected Record is to search for and select the record, backspace over the Selected Record, load the information from the Selected Record into the Buffer Storage of the Tape Data Selector, and process The Selected Record by either the "IBM 407" Accounting Machine or the "IBM 519" Card Punch, or any suitable Data Processing Machine. The File Search feature provides the ability to select particular bits of information via the Tape Emitter Hubs. The File Search operation goes considerably farther than the Normal Record Skip Operation in that we have the ability to perform a search for specific characters in any location of the tape, and still have the full capabilities of entering all information that is located in this tape record, a Selected Record, into Buffer Storage for subsequent processing thereof. Thus we have all the information from a Selected Record available for processing, regardless of the location in the Selected Record of the word or combination of characters searched for to select the record.

By means of the Record Skip Hub we can obtain a specific record by recognition of a certain character within a particular column of record. However, with the Record Skip Control we can only select as a result of the recognition of this certain character, an entry into the Buffer Storage of that information following the certain character of the tape record. We cannot enter information preceding said certain character on the tape record into Buffer Storage.

The File Search Feature allows the searching for specific characters in specific columns, such as BOLT in columns 005, 006, 007 and 008, respectively. The File Search Feature also allows the searching for the specific characters, such as BOLT, in any consecutive, or non-consecutive, columns of the tape. As explained earlier herein, these two "modes of operation" of the File Search circuitry are termed respectively, Fixed Field Operation and Floating Word Operation.

From the prior description it is appreciated that the Fixed Field Operation and the Floating Word Operation of the Tape Data Selector may be employed jointly or independently.

The Fixed Field Operation will perform a search of a tape record, for a combination, such as the word SCREW or the word BOLT. However, we must know that we are now searching, let us assume, from column 025 of the tape record on up until the column 030 of the tape record, if we are searching for the character combination SCREW. By this we mean that if we see an S in column 025 of the tape record we will proceed to examine the following columns (026, 027, 028 and 029) for the characters CREW in that order. Thus if we find an S in column 025 we have the ability without the Floating Word Operation, but with the Fixed Field Operation, to select the record if columns 026, 027, 028 and 029 contain the characters C, R, E and W in that order. It is apparent that we have the ability to search for the combination SCREW or BOLT occurring in specified columns of a tape record by means of a Fixed Field Operation. However, Fixed Field Operation is very limited in that Floating Word Operation is very useful, for example, in the case of part number tapes where the description may consist of several words. Let us assume that we are looking for the word Key within a part number tape, we could locate a description such as KEY LEVER BLANK which would be a description in a particular part number. Now if we are not aware of what column of the tape record the K would be located in, we perform a Floating Word Operation and accept the consecutive set of characters representing KEY in any tape columns. The Floating Word Operation is very useful in searching for descriptions of items of information that are variable in length, and variable in word content. By a Floating Word Operation we may search for any word, or portion of a word, in a description. Correspondingly, the Fixed Field Operation is very useful in searching, for example, for particular part numbers, where we are always looking for a part number to begin in a particular column of a tape record.

The Floating Word Operation and the Fixed Field Operation are each of great utility in file searching, because each one can accomplish certain particular types of searching jobs most expediently. However, for flexibility in file searching the Floating Word Operation is probably the most desirable because with it we are able to handle any combination in any columns, rather than in specific columns.

*Brief Summary of Floating Word Operation*

Reference is made to FIG. 4. Object in the illustrative example is to search for the words SCREW and BOLT within a tape record and when either of these words is located, process the record containing the selected word.

The operation of searching for either of two or more floating words is fundamentally the same as searching for a single word with the following exceptions.

(a) The Tape Block Column Counter is now reset when the first character of either word is recognized (i.e., reset the counter 256 when either the letter S or the letter B appears). This is accomplished by transferring the fourth Electronic Selector 204 from the output of OR 220, whenever an S is recognized by an output from AND 211, or a B is recognized by an output from AND 225. The Selector 204 is returned to normal N 204, at the time the Tape Block Column Counter transfers from 000 to 001.

(b) Electronic Selectors 201 and 202 are used to condition the proper AND circuit groups either 214–218 or 221–225 to establish the character sequence to be examined, as dictated by whether the S was recognized first or the B was recognized first. If an S was recognized by an output from AND 211 then Electronic Selector 201 was transferred. This selector 201 then provides a positive output voltage from its transfer point to condition the AND circuits in the group 214–217, to recognize a C in column 001, an R in column 002, an E in column 003 and a W in column 004. If a B was recognized first by an output from AND 225 then Electronic Selector 202 would be transferred. Electronic Selector 202 would then provide a positive output voltage from its transfer point to condition the AND circuits in the group 221–223, to recognize an O in column 001, an L in column 002, and a T in column 003.

(c) Because the words being searched for do not have the same number of characters, the Field Definition (FD) Hub must be energized for a duration to cover only the number of characters in the word being examined. This is controlled by transferring Electronic Selector 203 each time a column output 001 is recognized from the Tape Block Column Counter. This output 001 is controlled by AND circuit 207. The selector is dropped by the output of OR circuit 212. This output is created each time a tape character S or B is recognized, or a column 003 appears, if the searching sequence for the word BOLT has been established by transfer of selector 202, or if a column 004 appears if the searching sequence for the word SCREW has been established by transfer of selector 201.

(d) The MFI Hub is pulsed on column counter output 004 and an S condition, or from a column counter output of 003 and a B condition as developed at the output of OR circuit 213. Pulsing the MFI Hub provides a means of turning on the Multiple Field Interlock Condition Trigger, if the File Search Skip Trigger, was not turned on during the examination of a field. To explain the purpose for turning on the Multiple Field Interlock Condition Trigger, assume that the letters S, C and R have been recognized in their correct sequence. The next character read from tape is the character A. Since the A is not a correct character, the FS Hub does not receive a pulse, causing the File Search Skip Trigger and the File Search Skip Condition Trigger, to be turned ON. Turning on the File Search Skip Condition Trigger inhibits OR gate 286, so that a File Search Backspace cannot be obtained, and the record would be skipped. The File Search Skip Condition Trigger cannot be reset until the end of the record, so if a search of any additional fields is to be made and indicate the record is one selected for processing, another means must be provided to obtain an output from OR gate 286. At the end of the field just examined the MFI Hub received a pulse from OR circuit 213 caused by a Column Counter Output of 004 and a S condition coincidence. During this pulse interval, AND gate 284A was sampled, but the output was inhibited by the File Search Skip Trigger being ON, at the time. At the end of the pulse interval the negative shift reset the File Search Skip Trigger. When the next field to be examined arrives and provides perfect character coincidence namely S, C, R, E, W or B, O, L, T then the File Search Skip Trigger is not turned ON, and at the end of the field the MFI Hub is pulsed again by the 004 and S condition. This time the AND gate 284A is sampled and the output is not inhibited because the File Search Skip Trigger was not turned ON, so the gate pulse turns ON the Multiple Field Interlock Condition Trigger. Turning ON the Multiple Field Interlock Condition Trigger provides the condition for OR gate 286 so that a File Search Backspace can now be obtained indicating a Selected Record. The File Search Skip Trigger is also reset each time the Column Counter Reset Hub 232 is pulsed. The File Search Skip Trigger is reset from the Column Counter Reset Hub so that it will always be OFF at the beginning of each field to be examined. By checking the pickup of Electronic Selector 203 it will be seen that any time the Tape Block Column Counter is advanced to 001 this selector will be transferred. The Transfer position of this selector provides the Field Definition Hub conditioning voltage so that with this type of wiring the first character on tape causes the File Search Skip Trigger and the File Search Skip Condition Trigger to be turned ON unless the first character is an S or a B. If the first character on tape is an S or a B then the Electronic Selectors are transferred to begin examination of the following characters for selected record determination.

From the detailed descriptions of the Floating Word Operation and Fixed Field Operation as set forth herein, it will be readily apparent to those skilled in the art that these operations may: (1) be combined; and (2) any one of many words, or character sequences, may be searched for in either the Fixed Field Operation or the Floating Word Operation or a combination thereof.

While there have been shown and described and pointed out the fundamental novel features of the invention as applied to a preferred embodiment, it will be understood that various omissions and substitutions and changes in the form and details of the device illustrated and its operation may be made by those skilled in the art without departing from the spirit of the invention. It is the intention therefore, to be limited only as indicated by the scope of the following claims.

What is claimed is:

1. In an information retrieval system operating to retrieve a block of information identified by non-order determining indicia, an information storage system comprising, storage means constructed to store a plurality of groups of signals wherein each group includes at least signals representing particular data characters, said characters being arranged in blocks of information, each of said blocks of information including as a portion thereof a predetermined word for identifying each of said information blocks from all the other blocks in said storage means, said predetermined word being located anywhere within its respective information block and comprising non-order determining indicia, and first means coupled to said storage means for utilizing said predetermined word to control the translation of its respective informaiton block from the storage means.

2. In an information retrieval system operating to retrieve a block of information identified by non-order determining indicia, an information storage system comprising, storage means constructed to store a plurality of groups of signals wherein each group includes at least signals representing particular data characters, said characters being arranged in blocks of information, first means coupled to said storage means for identifying each character in said information blocks, each of said blocks of information including as a portion thereof a predetermined word for identifying each of said information blocks from all the remaining blocks in said storage means, said predetermined word being located anywhere within its respective information block and comprising non-order determining indicia, and second means including said first means for utilizing said predetermined word to control the translation of its respective information block from the storage means.

3. In an information retrieval system operating to retrieve a block of information identified by non-order determining indicia, an information storage system comprising, storage means constructed to store a plurality of groups of characters, said characters being arranged in blocks of information, each of said information blocks including as a portion thereof a predetermined word for identifying each of said information blocks from all of the remaining blocks in the storage means, each of said predetermined words being located anywhere within its respective information block and comprising non-order determining indicia, and utilization means coupled to the storage means for selectively receiving upon the identification of the respectively associated predetermined word a desired one of said information blocks from the storage means.

4. In an information retrieval system operating to retrieve a block of information identified by non-order determining indicia, an information storage system comprising, storage means constructed to store a plurality of groups of characters, said characters being arranged in blocks of information, each of said information blocks including as a portion thereof a predetermined word for identifying each of said information blocks from all of the remaining blocks in the storage means, each of said predetermined words being located anywhere within its respective information block and comprising non-order determining indicia, utilization means coupled to the storage means for selectively receiving upon the identification of the respectively associated predetermined word a desired one of said information blocks from the storage means, and means coupled to the storage means for selectively skipping information blocks failing to contain said desired predetermined word.

5. In an information retrieval system operating to retrieve a block of information identified by non-order determining indicia, an information storage system comprising, storage means constructed to store a plurality of groups of characters, said characters being arranged in blocks of information, each of said information blocks including as a portion thereof a predetermined word for identifying each of said respective information blocks from all of the remaining blocks in the storage means, each of said predetermined words being located anywhere within its respective information block and comprising non-order determining indicia, means for selecting a desired one of said information blocks by searching for one of said respective predetermined words, and utilization means coupled to the storage means for selectively receiving a desired one of said information blocks from the storage means upon the selective identification of said predetermined word respectively associated therewith.

6. In an information retrieval system operating to retrieve a block of information identified by non-order determining indicia, an information storage system comprising, storage means constructed to store a plurality of groups of characters, said characters being arranged in blocks of information, each of said information blocks including as a portion thereof a predetermined word for identifying each of said respective information blocks from all the remaining blocks in the storage means, each of said predetermined words being located anywhere within its respective information block and comprising non-order determining indicia, means for locating a desired one of said information blocks by searching for said respective predetermined word, means responsive to the location of said respective predetermined word for deriving the starting position of said located information block, and utilization means coupled to the storage means for selectively receiving a desired one of said information blocks from the storage means upon the location of the starting position of the identified information block.

7. In an information retrieval system operating to retrieve a block of information identified by non-order determining indicia, an information storage system, including, storage means constructed to store a plurality of blocks of signals wherein each block includes at least signals representing particular data and further includes signals representing a predetermined word for identifying the particular data, said predetermined word being located anywhere within a portion of its respective block of signals and comprising non-order determining indicia, data processing apparatus for processing signals representing particular data in the different blocks in the plurality, means responsive to the storage means for sequentially presenting the different blocks of signals for the processing of such signals, and means coupled to the storage means for searching the different blocks in the plurality for a particular predetermined word during the sequential presentation of the blocks in the storage means and for transferring signals to the data processing apparatus by said presenting means from the one particular block in the plurality designated by said predetermined word.

8. In an information retrieval system operating to retrieve a block of information identified by non-order determining indicia, an information storage system, including, storage means constructed to store at each of a plurality of spaced locations on the storage means at least groups of data signals and a predetermined word associated with the data signals to identify the data signals, said groups of data signals and its respective predetermined word being arranged in blocks of information, each of said predetermined words being located anywhere within a portion of its respective information block and comprising non-order determining indicia, means responsive to said predetermined word in the storage means for searching said predetermined word identifying the different groups of data signals in the storage means to locate an information block identified by a particular predetermined word and for obtaining the selection of said identified information block, and utilization means for receiving the single information block selected by the search means for processing said information block.

9. In an information retrieval system operating to retrieve a block of information identified by non-order determining indicia, an information storage system comprising, storage means constructed to store a plurality of groups of characters, said characters being arranged in blocks of information, each of said information blocks including at least a plurality of data characters and a predetermined word, each of said predetermined words comprising a portion of its respective information block and serving to identify its respective block of information from all the remaining blocks in the storage means, each of said predetermined words being located anywhere within its respective information block and comprising non-order determining indicia, utilization means coupled to the storage means for selectively receiving a desired one of said information blocks from said storage means, first signal means for representing said predetermined word of a desired one of said information blocks, second signal means coupled to the storage means for successively receiving signals corresponding to said predetermined words of successive information blocks in said storage means, compare means coupled to the first means and the second means for comparing signals represented by the first means with the signals in the second means to obtain a compare signal when an equality is achieved, and means coupled to the compare means and responsive to said compare signal for introducing the desired one of said information blocks to said utilization means.

10. In an information retrieval system operating to retrieve a block of information identified by non-order determining indicia, an information storage system including, a memory unit including a plurality of spaced positions for storing blocks of information, each of said information blocks including at least data signals and a predetermined word, each of said predetermined words forming a portion of its respective information block and serving to identify its respective information blocks from all the other information blocks in the memory unit, each of said predetermined words being located anywhere within its respective information block and comprising non-order determining indicia, and means coupled to the memory unit and responsive to a particular predetermined word for selecting the particular information block from the memory unit having a predetermined word corresponding to said particular predetermined word.

11. In an information retrieval system operating to retrieve a block of information identified by non-order determining indicia, an information storage system including, a memory unit including a plurality of spaced positions for storing blocks of information, each of said information blocks including at least data signals and a predetermined word, each of said predetermined words forming a portion of its respective information block and serving to identify its respective information block from all the other information blocks in the memory unit, each of said predetermined words being located anywhere within its respective information block and comprising non-order determining indicia, first output means coupled to the memory unit for successively receiving desired blocks of information from the memory unit, and means coupled to the output means and responsive to a particular predetermined word for causing a particular information block having a predetermined word corresponding to said particular predetermined word to be selected from the memory unit and introduced to the output means.

12. In an information retrieval system operating to retrieve a block of information identified by non-order determining indicia, an information storage system including, a memory unit including a plurality of spaced positions for storing blocks of information, each of said information blocks including at least data signals and a predetermined word, each of said predetermined words forming a portion of its respective information block and serving to identify its respective information block from all the other information blocks in the memory unit, each of said predetermined words being located anywhere within its respective information block and comprising non-order determining indicia, output means coupled to the memory unit for successively receiving desired information blocks from the memory unit, means coupled to the output means and responsive to a particular predetermined word for causing a particular information block having a predetermined word corresponding to said particular predetermined word to be selected from the memory unit, means coupled to the storage means for identifying each data signal in said selected information block, and means responsive to the identifying means and the selecting means for introducing said identified information block to said output means.

13. A file search tape data selector for locating a tape data record having a predetermined character group therein at predetermined character count locations in said record, comprising, means for controlling the motion of said tape drive, means for sensing character bits being simultaneously read from tape, a plurality of AND gates each having inputs corresponding to the bits of a different character in said group, counter means connected to provide an output upon sensing characters being read from tape, respective counter outputs being connected as respective inputs to said AND gates to enable an actuation of a respective AND gate in response to a predetermined character being sensed at its predetermined location, gate means being activated by any of said respective counter outputs not accompanied by an output from one of said AND gates to indicate that the tape block being read is to be skipped during the file search, a bistable device, said bistable device being normally set in a status indicating selection of a block being read, and said gate means being connected to actuate said bistable device upon actuation of said gate means, whereby non-actuation of said bistable device during reading a block indicates selection of the tape data record.

14. A file search tape data selector for locating a tape data record having a predetermined character group therein at predetermined character count locations in said record, comprising, means for controlling the motion of said tape drive, means for sensing character bits being simultaneously read from tape, a plurality of AND gates each having inputs corresponding to the bits of a different character in said groups, counter means connected to provide an output upon sensing characters being read from tape, respective counter outputs being connected as respective inputs to said AND gates to enable an actuation of a respective AND gate in response to a predetermined character being sensed at its predetermined location, gate means being actuated by any of said respective counter outputs not accompanied by an output from one of said AND gates to indicate that the tape block being read is to be skipped during the file search, a bistable device, said bistable device being normally set in a status indicating selection of a block being read, said gate means being connected to actuate said bistable device upon actuation of said gate means, and means for connecting the output of said bistable device to said means for controlling motion to reposition said last read record for a rereading when said bistable device is not actuated during its reading.

References Cited by the Examiner

UNITED STATES PATENTS

| | | | |
|---|---|---|---|
| 2,900,132 | 8/1959 | Burns et al. | 235—61.7 |
| 2,961,643 | 11/1960 | Ayres et al. | 340—174 |
| 2,967,296 | 1/1961 | Kun Li Chien et al. | 340—172.5 |

ROBERT C. BAILEY, *Primary Examiner.*

MALCOLM A. MORRISON, *Examiner.*

R. M. RICKERT, *Assistant Examiner.*